United States Patent
Malik et al.

(10) Patent No.: US 12,380,391 B2
(45) Date of Patent: Aug. 5, 2025

(54) METHOD AND SYSTEM FOR EVALUATING CONTRACT WORTHINESS OF PERFORMING ARTISTS

(71) Applicant: INFOSYS LIMITED, Bangalore (IN)

(72) Inventors: Romi Malik, Bangalore (IN); Debamalya Choudhury, Bangalore (IN); Vinay Govindan Muralidharan, Bangalore (IN); Kanad Bhowmik, Bangalore (IN); Debojyoti Das, Bangalore (IN)

(73) Assignee: Infosys Limited, Bangalore (IN)

( * ) Notice: Subject to any disclaimer, the term of this patent is extended or adjusted under 35 U.S.C. 154(b) by 106 days.

(21) Appl. No.: 18/102,381

(22) Filed: Jan. 27, 2023

(65) Prior Publication Data

US 2024/0193524 A1    Jun. 13, 2024

(30) Foreign Application Priority Data

Dec. 8, 2022    (IN) .............................. 202241070841

(51) Int. Cl.
    *G06Q 10/0639* (2023.01)
    *G06N 20/00* (2019.01)
    *G06Q 50/00* (2012.01)

(52) U.S. Cl.
    CPC ....... *G06Q 10/06393* (2013.01); *G06N 20/00* (2019.01); *G06Q 50/01* (2013.01)

(58) Field of Classification Search
    None
    See application file for complete search history.

(56) References Cited

U.S. PATENT DOCUMENTS

| | | | | |
|---|---|---|---|---|
| 7,676,400 B1 * | 3/2010 | Dillon | ................... | G06Q 30/02 |
| | | | | 705/26.7 |
| 7,970,767 B2 * | 6/2011 | Probst | ................... | G06F 16/313 |
| | | | | 707/777 |
| 8,386,486 B2 * | 2/2013 | Zhang | ................... | G06Q 30/02 |
| | | | | 382/181 |
| 9,323,836 B2 | 4/2016 | Freeman et al. | | |

(Continued)

FOREIGN PATENT DOCUMENTS

EP    1258826 A1 *  11/2002  ............. G06Q 40/04

*Primary Examiner* — Romain Jeanty
(74) *Attorney, Agent, or Firm* — Finnegan, Henderson, Farabow, Garrett & Dunner LLP

(57) ABSTRACT

A method and system for evaluating contract-worthiness of performing artists is disclosed. The method includes receiving consolidated data corresponding to each of a set of performing artists. The method further includes processing the consolidated data by classifying a set of topics in the text data into a plurality of categories through a ML classification model, determining user engagement behavior segments based on sentiment scores associated with the text data, and determining a plurality KPIs based on the plurality of metrics, the plurality of categories, and the user engagement behavior segments. Further, the method includes calculating a contract worthiness score for the set of performing artists based on the plurality of KPIs using a trained ML contract worthiness scoring model and evaluating one or more of the set of performing artists for their contract worthiness based on the contract worthiness score and a threshold contract worthiness score.

16 Claims, 37 Drawing Sheets

(56) References Cited

U.S. PATENT DOCUMENTS

| | | | |
|---|---|---|---|
| 9,514,476 B2 | 12/2016 | Kay et al. | |
| 10,733,240 B1 | 8/2020 | Callahan | |
| 2007/0208728 A1* | 9/2007 | Zhang | G06F 16/951 |
| | | | 707/999.005 |
| 2008/0255972 A1* | 10/2008 | Ulrich | G06Q 30/04 |
| | | | 705/34 |
| 2010/0121857 A1* | 5/2010 | Elmore | G06F 16/2358 |
| | | | 707/748 |
| 2013/0035985 A1* | 2/2013 | Gilbert | G06Q 30/0202 |
| | | | 705/7.31 |
| 2015/0032673 A1 | 1/2015 | Hu et al. | |
| 2015/0356601 A1* | 12/2015 | Lu | G06Q 30/0261 |
| | | | 705/14.53 |
| 2017/0109839 A1 | 4/2017 | Berryman | |
| 2018/0268506 A1* | 9/2018 | Wodetzki | G06F 15/76 |

\* cited by examiner

| ARTICLE ID 302 | EXTERNAL AUTHOR ID 304 | HEADLINE 306 | AUTHOR 308 | CONTENT 310 | MEDIA PROVIDER 312 | REGION 314 | PUBLISH DATE 316 | POST TYPE 318 |
|---|---|---|---|---|---|---|---|---|
| 9247063331707 | 1130633288 | Post FROM: umarebru | UMAREBRU | when is your new album coming? #sooon' | Media Provider-1 | United States | 5/21/2019 | QUOTE_POST |
| 9247063093820 | 1129438658 | Post FROM: Prastvinnie | PRASTVINNIE | I just love this Dutch singer! she LIGHTS UP The AGT FINALS Stage; We're SHOOK!! \| America's | Media Provider-1 | United States | 5/17/2019 | |
| 9247062893759 | 1130147854 | Post FROM: Ernestmaas55 | ERNESTMAAS55 | Your sweet voice always gives me peace. I love this version õŸ˜Š | Media Provider-1 | United States | 5/19/2019 | |
| 9215532313394 | 1136460198 | Post FROM: NevilleGaunt | NEVILLEGAUNT | She IS the love of my life!! SO awesome!!! Wow! She makes me SO happy!! :-) | Media Provider-1 | United States | 6/6/2019 | REPOST |
| 9214695402753 | 1136382816 | Lisbeth J on The Story of Glennis Grace \| Beyond Talent Show-1 | LISBETH | Please don't think that she had any influence on that.. She didn't hide it...at the agt site you could read it that she had career in the Netherlands | Media Provider-2 | United States | 6/5/2019 | |
| 9206418690435 | 1135571422 | Revita 2me on The Story of Glennis Grace \| Beyond Talent Show-1 | REVITA 2ME | õŸ˜—õŸ˜—GG | Media Provider-2 | United States | 6/3/2019 | |
| 9204059422028 | 1135350155 | Opa Opa on The Story of Glennis Grace \| Beyond Talent Show-1 | OPA OPA | â ¤GGâ ¤ GODS GIFT | Media Provider-2 | United States | 6/3/2019 | |
| 9204042422977 | 1135348487 | jorge diaz on Dimash Kudaibergen - Autumn Strong Reaction | JORGE DIAZ | Hi. If you like Whitney you should watch the best cover of run to you...you will thanks me later lol | Media Provider-2 | United States | 6/3/2019 | |

FIG. 3

| Keyword Set 602 | Keyword Description 604 | Illustrative Keywords 606 |
|---|---|---|
| Keyword Set 1 | Tagging online campaign posted by Artists | "Click the link to vote", "Watch the full video here", "see the premiere of my", "Vote Now", "I will sing", "Vote for me", "love to hear your comments", "Thanks for all the support", "Are you coming? still some tickets available", "I'm so happy to tell you guys", "Thank you for having me", "cant wait to see you there" |
| Keyword Set 2 | Tagging online campaign posted by Associated Partners | "Get tickets today...<artist name/ social media handle>", "vote for...<artist name/ social media handle>", "Singing at the live shows...<artist name/ social media handle>", "Tonight performing in...<artist name/ social media handle>", "Join us...<artist name/ social media handle>", "Tickets to see...<artist name/ social media handle>", "Register to win tickets...<artist name/ social media handle>", "Featuring Performances by...<artist name/ social media handle>", "Your votes saved...<artist name/ social media handle>", "Listen to the Voice of...<artist name/ social media handle>" |
| Keyword Set 3 | Tagging online campaign posted by peer artists | "Special guest join...<artist name/ social media handle>", "will be duetting...<artist name/ social media handle>", "will be playing...<artist name/ social media handle>", "<artist name/ social media handle>...Playing together with", "More information about the event or ticket", "<artist name/ social media handle>...sounded great", "<artist name/ social media handle>...get your VIP tickets @", "join me welcoming...<artist name/ social media handle>", "glad to join <artist name/ social media handle>...stage performance" |
| Keyword Set 4 | Tagging Artist talent related posts | "beautiful voice...<artist name/ social media handle>", "amazing voice...<artist name/ social media handle>", "angelic voice...<artist name/ social media handle>", "<artist name/ social media handle>...the voice of an angel", "the voice of...<artist name/ social media handle>", "artist name/ social media handle>", "the voice is undeniable", "average voice...<artist name/ social media handle>", "<artist name/ social media handle>...sounded great", "<artist name/ social media handle>...sounded awful", "<artist name/ social media handle>...was off pitch", "<artist name/ social media handle>...was pitchy", "<artist name/ social media handle>...is inexperienced vocally", "<artist name/ social media handle>...one of the best songwriters", "Singer-Songwriter...<artist name/ social media handle>" |

FIG. 6A

| | | |
|---|---|---|
| Keyword Set 5 | Tagging artist persona related posts | "humble down to earth person...<artist name/ social media handle>", "<artist name/ social media handle>...has been honest", "<artist name/ social media handle>...beautiful soul", "<artist name/ social media handle>...Honesty","<artist name/ social media handle>...supported charity", "<artist name/ social media handle>...well dressed", "<artist name/ social media handle>...appeared at Charity night", "<artist name/ social media handle>...is amazing though", "so proud of...<artist name/ social media handle>", "<artist name/ social media handle>...is beautiful", "<artist name/ social media handle>...is such an inspiration", "<artist name/ social media handle>...has a lot of energy", "<artist name/ social media handle>...seems smart and intelligent", "<artist name/ social media handle>...is friendly and nice" |
| Keyword Set 6 | Tagging Artist event related posts | "<artist name/ social media handle>...performs live", "<artist name/ social media handle>...Perform at Finale", "Concert by...<artist name/ social media handle>", "<artist name/ social media handle>...performing an outdoors concert" "Live Performance", "<artist name/ social media handle>...Performs Debut Single", "<artist name/ social media handle>...did a tour", "<artist name/ social media handle>...appeared on American Idol", "<artist name/ social media handle>...appeared on AGT", "watching performance by...<artist name/ social media handle>", "waiting for <artist name/ social media handle>...america tour" |
| Keyword Set 7 | Tagging artist merchandise related posts | "where to get <artist name/ reference> pic shirt", "got T-Shirt...signed by <artist name/ reference>", "<artist name/ reference>...share merchandise store location", "<artist name/ reference>...web site w/ merch", "<artist name/ reference>...merchandise buy", "love to collect original merch...<artist name/ reference>", "<artist name/ reference>...got $ off merchandise", "<artist name/ reference>...give merchandise", "wearing original merchandise bag...<artist name/ reference>", "offering to ship <artist name/ reference>...shirts posters" |

FIG. 6B

| Topic 608 | Topic Description 610 | Keywords Set 612 | Illustrative Keywords 614 |
|---|---|---|---|
| Topic - 1 | Online campaign posted by Artists | Keywords Set-1 | "Click the link to vote", "Watch the full video here", "see the premiere of my", "Vote Now", "I will sing", "Vote for me", "love to hear your comments", "Thanks for all the support", "Are you coming? still some tickets available", "I'm so happy to tell you guys", "Thank you for having me", "cant wait to see you there" |
| Topic - 2 | Online campaign posted by Associated partners | Keywords Set-2 | "Get tickets today...<artist name/ social media handle>", "vote for...<artist name/ social media handle>", "Singing at the live shows...<artist name/ social media handle>", "Tonight performing in...<artist name/ social media handle>", "Join us...<artist name/ social media handle>", "Tickets to see...<artist name/ social media handle>", "Register to win tickets...<artist name/ social media handle>", "Featuring Performances by...<artist name/ social media handle>", "Your votes saved...<artist name/ social media handle>" |

| Author 616 | Content 618 | Assigned_Topic 620 |
|---|---|---|
| Social User-1 | My favorite contestant.... performing at concert...Are you coming? still some tickets available | Topic-1 |
| Social User-2 | @abc123 This Friday I performed....watch the full video here and Vote for me | Topic-1 |
| Artist-1 | I'm in the running to win the TV Competition Contestant...Voting closes this Friday...You can vote 25x per day per email...Click the link to vote! Thanks for your help | Topic-1 |
| Artist-1 | This Friday I performed...watch the full video here and Vote for me | Topic-1 |

FIG. 6E — 600E

| Assigned_Topic 620 | Author 616 | Content 618 | Consider/ Discard 622 |
|---|---|---|---|
| Topic-1 | Social User-1 | My favorite contestant.... performing at concert...Are you coming? still some tickets available | Discard |
| Topic-1 | Social User-2 | @abc123 This Friday I performed...watch the full video here and Vote for me | Discard |
| Topic-1 | Artist-1 | I'm in the running to win the TV Competition Contestant...Voting closes this Friday...You can vote 25x per day per email...Click the link to vote! Thanks for your help | Consider |
| Topic-1 | Artist-1 | This Friday I performed....watch the full video here and Vote for me | Consider |

| Keyword Set 702 | Keyword Description 704 | Illustrative Keywords 706 |
|---|---|---|
| Keyword Set 8 | Artist Info/ Biography Video | "\<artist name/ Reference\>…Lifestyle, Personality, Biography", "Check out my Story…\<artist name/ Reference\>", "\<artist name/ Reference\>…tells us about some stories", "\<artist name/ Reference\>…Find Singer Celebrity Lifestyle From Video", "\<artist name/ Reference\>…5-Things To Know About The Talented Star", "The story of…\<artist name/ Reference\>", "\<artist name/ Reference\>…Heartbreaking Story", "\<artist name/ Reference\>…on What's Next After Big Win", "\<artist name/ Reference\>…Detailed life journey", "The Life of…\<artist name/ Reference\>…interview" |
| Keyword Set 9 | Talent Show Video | "\<artist name/ Reference\>…Wows the judges with…\<Talent show reference\>", "\<artist name/ Reference\>…Wows the coaches with…\<Talent show reference\>", "\<artist name/ Reference\>…Finale performance was speachless…\<Talent show reference\>", "\<artist name/ Reference\>…Live Finale…\<Talent show reference\>", "\<artist name/ Reference\>…Live Top 10 Performances…\<Talent show reference\>", "\<artist name/ Reference\>…season finale…\<Talent show reference\>", "\<artist name/ Reference\>…See more on our official site…\<Talent show reference\>", "\<artist name/ Reference\>…top live playoffs \<Talent show reference\>", "\<artist name/ Reference\>…Judges Comments…\<Talent show reference\>", "\<artist name/ Reference\>…Perform Surprising Duet…\<Talent show ref.\>" |
| Keyword Set 10 | Official Music Video | "official music video by…\<artist name/ Reference\>", "\<record lable reference\>", "Music video by…\<artist name/ Reference\>(Audio Only)…\<record lable reference\>", "\<artist name/ Reference\>…original song", "\<artist name/ Reference\>…(Official Video)", "\<artist name/ Reference\>…(Official audio)", "\<artist name/ Reference\>…(Official live video)", "\<artist name/ Reference\>…(Official Lyric Video)", "\<artist name/ Reference\>…(Official Music Video)", "\<artist name/ Reference\> (Acoustic)…\<record lable reference\>" |
| Keyword Set 11 | Livestream Video | "\<artist name/ Reference\>…livestream…subcribe to", "\<artist name/ Reference\>…Livestream by", "\<artist name/ Reference\>…livestream with", "watch livestream video…\<artist name/ Reference\> with", "LIVESTREAM…\<artist name/ Reference\> sing at", "\<artist name/ Reference\>…live streaming at", "\<artist name/ Reference\>…[LIVE STREAMING]", "LIVE STREAM…\<artist name/ Reference\>", "Daily live stream on \<artist name/ Reference\> at…(Live Stream)" |

FIG. 7A

| | | |
|---|---|---|
| Keyword Set 12 | Live Performance Video | "\<artist name/ Reference\>...Live performing with", "\<artist name/ Reference\>... (Live with...)", "\<artist name/ Reference\> at...Full Concert", "\<artist name/ Reference\> sings at...concert", "\<artist name/ Reference\>..live performance", "\<artist name/ Reference\>...performs on Live with ", "\<artist name/ Reference\>...live concert", "[LIVE]\<artist name/ Reference\> at...", "\<artist name/ Reference\> tour...concert" |
| Keyword Set 13 | Fan-made Video | "\<artist name/ Reference\>...Vocal Battle", "\<artist name/ Reference\>..finals winner battle", "\<artist name/ Reference\>..Battle (Same Songs)", "\<artist name/ Reference\>...say % of fans", "\<artist name/ Reference\>..Battle (same song!)", "\<artist name/ Reference\>...Vs...incredible performance", "\<artist name/ Reference\>...(Rigged Contest)", "\<artist name/ Reference\>..HOW TO VOTE", "Music evolution of...\<artist name/ Reference\>", "\<artist name/ Reference\>...real voice(without auto-tune)" |
| Keyword Set 14 | Vocal Coach Video | "Vocal Coach reacts to...\<artist name/ Reference\>","vocal coach reaction...\<artist name/ Reference\>", "\<artist name/ Reference\>...vocal coach and singer reacts to...\<artist name/ Reference\>", "\<artist name/ Reference\>...musician react","vocal coach deconstructs...\<artist name/ Reference\>", "\<artist name/ Reference\>..voice teacher reaction...\<artist name/ Reference\>","\<artist name/ Reference\>...reaction from vocal instructor", "vocal coach tribute...\<artist name/ Reference\>...Reaction", "vocal coaches react...\<artist name/ Reference\>", "reaction & analysis by Vocal Coach...\<artist name/ Reference\>" |
| Keyword Set 15 | Reaction Video | "REACTION: \<artist name/ Reference\>","reaction to the...\<artist name/ Reference\>","\<artist name/ Reference\>...[REACTION]", "\<artist name/ Reference\>...video reaction","\<artist name/ Reference\>...(REACTION!!)","\<artist name/ Reference\>...", "Reacts to...\<artist name/ Reference\> performance", "\<artist name/ Reference\>...reaction","Reacts \|...\<artist name/ Reference\>", "reaction by...\<artist name/ Reference\>" |

FIG. 7B

| GENRE 1002 | ARTIST NAME 1004 | HEADLINE 1006 | AUTHOR 1008 | SOCIAL MEDIA USER COMMENT 1010 | PUBLISH_DATE 1012 | MEDIA PROVIDER 1014 |
|---|---|---|---|---|---|---|
| Pop | Maddie | Kim G on Artist-1 – Nothing Good Comes (Audio Only) | KIM G | These songs have so much replay-ability | 4/30/2019 21:45 | Media Provider-2 |
| Pop | Maddie | Sheri Cox on Not Losing You - Artist-1 (Lyrics) | SHERI COX | LOVE this song. Absolutely beautiful words, melody and voice | 5/25/2019 18:58 | Media Provider-2 |
| Pop | Maddie | Jeremy L Bradley on Artist-1 Never Before Seen FIRST Performance!! - Talent Show-1 | TAMALA BOTHELL | Whoa! This was horrible | 5/18/2019 22:33 | Media Provider-2 |
| Pop | Maddie | POST FROM: skylovesmad | SKYLOVES | no offense but Artist-1 and Artist-2 actually suck | 6/6/2018 1:54 | Media Provider-1 |
| Pop | Maddie | POST FROM: magsed216 | MAGSED216 | @bobbybonesshow Artist-1 and Artist-3 was last concert and I am seeing them again on Date xxxx Butler county fair Allison Iowa.' | 6/6/2019 3:56 | Media Provider-1 |
| Pop | Maddie | POST FROM: Artist-1 | Artist-1 | I'm in the running to win the TV Competition Contestant for the People's Choice Awards!! Voting closes this Friday so I need your help! Click the link to vote! Thanks for your help!! Direct Link-Artist-1 https://t.co/VsqRS4OKJf | 9/13/2019 1:41 | Media Provider-1 |

FIG. 10A

| VIDEO CATEGORY 1016 | ARTIST JOURNEY PHASE 1018 | COMMENT CATEGORY 1020 | Theme 1022 | SENTIMENT 1024 | FOLLOWER TYPE 1026 |
|---|---|---|---|---|---|
| Official Music Video | Post-popularity | True Social | Artist Talent | Positive | Fan |
| Fan-Made Video | Post-popularity | True Social | Artist Talent | Positive | Fan |
| Talent Show Video | Post-popularity | True Social | Artist Talent | Negative | Adversary |
| | Post-popularity | True Social | Persona | Negative | Adversary |
| | Post-popularity | True Social | Event | Positive | Target Social User |
| | Post-popularity | True Social | Online Campaign | Positive | Fan |

FIG. 10B

| KPI Category 1202 | KPI Name 1204 | KPI Description 1206 |
|---|---|---|
| Artist Social Presence Related KPI's 418 | Pre/ During Event post volume change | Change in the music artist specific post volume during start and end date of the event |
| | Post-event post volume change | Change in the music artist specific post volume between event end date and +3/ +6/ +12 months |
| | Social post distribution index | This indicates ratio of count of social media platforms with artist's reference out of top-10 or 20 social media platforms |
| | Geo-wise social post distribution index | This indicates ratio of count of Geo's with artist's reference over social media out of total no. of countries |
| | Overall post-event sentiment index | Overall social media user sentiment between event end date and +3/ +6/ +12 months |
| | Artist related positive true social posts | Count of artist related true social posts with positive sentiment |
| | Artist related positive online campaigns | Count of artist related online campaigns with positive sentiment |
| | Multimedia diversity factor | This indicates ratio of count of distinct Multimedia types out of total no. of distinct Multimedia Content categories |
| | Multimedia viewership | Total viewership across all the Multimedia Content |
| | Avg. comments per Multimedia Content type | Ratio of total comments by social users towards artist related Multimedia and total no. of artist related Multimedia Content |

FIG. 12A

| | | |
|---|---|---|
| Artist Talent Quality & Persona Related KPI's 420 | Talent-specific post volume | Count of artist specific Social posts having reference towards music talent such as voice quality, song writing, pitch etc. |
| | Persona-specific post volume | Count of artist specific Social posts having reference towards music artist persona such as looks, style, nature, attitude etc. |
| | Music Event participation count | Count of live and pre-recorded music events (e.g. concerts, stage performance, TV shows) participated by music artist |
| | Count of albums released | Count of official music albums released by music artist (includes solo and collaboration albums) |
| | Count of singles released | Count of official singles released by music artist |
| | Count of duet songs released | Count of duet songs released by music artist in collaboration with other music artist/s |
| Social Media User Base Related KPI's 422 | Total unique user volume | Count of unique social media users who are posting about a particular music artist, across all the social media platforms |
| | Platform-wise unique user volume | Count of unique social media users who are posting about a particular music artist on individual social media platforms |
| | Social media user growth rate | Y-o-Y/ M-o-M growth of Total unique user volume i.e. incremental unique user volume divided by total unique user volume |
| | Total adversary volume | Count of unique social media users who are posting negative opinion about a particular music artist, across all the social media platforms |

FIG. 12B

| | | |
|---|---|---|
| Future Commercial Viability Related KPI's 424 | Unique users willing to buy artist merchandise | Count of unique social media users who expressed their keenness to buy music artist related merchandise |
| | Unique users willing to download songs/albums | Count of unique social media users who expressed their keenness to buy/ download music artist related songs/albums |
| | Unique users count willing to buy tickets | Count of unique social media users who expressed their keenness to buy music artist related event tickets |
| | Count of Multimedia content with 1 million+ views | Count of music artist related videos with 1 million+ views, these videos generate substantial revenue for music artists |
| | Count of social media campaigns related to events/ merchandise/ new releases | Count of music artist related campaigns which will uplift revenues from event tickets sale, merchandise purchase, new release downloads etc. |
| | Total Target User Count | Total count of social media users who expressed their keenness to buy music artist related merchandise, event tickets, songs, albums etc. |
| | Estimated Revenue Potential | Revenue estimated based on count of users who expressed their keenness to buy music artist related merchandise, event tickets, songs, albums etc. Estimated revenue is summation of count of users multiplied by average unit price of ticket, merchandise, song, album etc. |

FIG. 12C

| | | Artist Social Presence Related KPI's 418 | | Artist Talent Quality & Person Related KPI's 420 | | Social Media User Base Related KPI's 422 | | Future Commercial Viability Related KPI's 424 | |
|---|---|---|---|---|---|---|---|---|---|
| GENRE 1302 | ARTIST NAME 1304 | Post-event post volume 1306 | Multimedia diversity factor 1308 | Person-specific post volume 1310 | Event participation count 1312 | Social Media user growth rate 1314 | Total adversary volume 1316 | Unique users willing to buy artist merchandise 1318 | Unique users count willing to buy tickets 1320 |
| Pop | Artist-1 | 750000 | 8 | 65000 | 220 | 15% | 419 | 482 | 935 |
| Pop | Artist-2 | 2000 | 3 | 80 | 17 | -5% | 400 | 0 | 7 |
| Pop | Artist-3 | 150000 | 6 | 25000 | 89 | 11% | 205 | 73 | 243 |
| Pop | Artist-4 | 15000 | 4 | 120 | 50 | -7% | 528 | 3 | 78 |
| Pop | Artist-5 | 72000 | 5 | 80 | 24 | -25% | 1720 | 14 | 12 |

| GENRE 1302 | ARTIST NAME 1304 | Artist Social Presence Related KPI's 418 | | Artist Talent Quality & Person Related KPI's 420 | | Social Media User Base Related KPI's 422 | | Future Commercial Viability Related KPI's 424 | | ACTUAL CONTACT WORTHINESS INDICATOR 1402 |
|---|---|---|---|---|---|---|---|---|---|---|
| | | Post-event post volume 1306 | Multimedia diversity factor 1308 | Person-specific post volume 1310 | Event participation count 1312 | Social Media user growth rate 1314 | Total adversary volume 1316 | Unique users willing to buy artist merchandise 1318 | Unique users count willing to buy tickets 1320 | |
| Pop | Artist-1 | 750000 | 8 | 65000 | 220 | 15% | 419 | 482 | 935 | 1 |
| Pop | Artist-2 | 2000 | 3 | 80 | 17 | -5% | 400 | 0 | 7 | 0 |
| Pop | Artist-3 | 150000 | 6 | 25000 | 89 | 11% | 205 | 73 | 243 | 1 |
| Pop | Artist-4 | 15000 | 4 | 120 | 50 | -7% | 528 | 3 | 78 | 0 |
| Pop | Artist-5 | 72000 | 5 | 80 | 24 | -25% | 1720 | 14 | 12 | 0 |

| GENRE 1502 | ARTIST NAME 1504 | Actual_Contract Worthiness Indicator 1506 | Contract-Worthiness Score 1508 |
|---|---|---|---|
| Pop | Artist-1 | Not Contract-worthy | 0.58 |
| Pop | Artist-2 | Contract-worthy | 0.69 |
| Pop | Artist-3 | Not Contract-worthy | 0.51 |
| Pop | Artist-4 | Not Contract-worthy | 0.04 |
| Pop | Artist-5 | Not Contract-worthy | 0.51 |
| Pop | Artist-6 | Contract-worthy | 0.66 |
| Pop | Artist-7 | Contract-worthy | 0.72 |
| Pop | Artist-8 | Not Contract-worthy | 0.21 |
| Pop | Artist-9 | Not Contract-worthy | 0.22 |
| Pop | Artist-10 | Contract-worthy | 0.89 |
| Pop | Artist-11 | Not Contract-worthy | 0.45 |
| Pop | Artist-12 | Contract-worthy | 0.92 |
| Pop | Artist-13 | Not Contract-worthy | 0.37 |
| Pop | Artist-14 | Not Contract-worthy | 0.37 |

| GENRE 1302 | ARTIST NAME 1304 | Artist Social Presence Related KPI's 418 | | Artist Talent Quality & Person Related KPI's 420 | | Social Media User Base Related KPI's 422 | | Future Commercial Viability Related KPI's 424 | | CONTACT WORTHINESS SCORE 1602 | CONTACT WORTHINESS INDICATOR 1604 |
|---|---|---|---|---|---|---|---|---|---|---|---|
| | | Post-event post volume 1306 | Multimedia diversity factor 1308 | Person-specific post volume 1310 | Event participation count 1312 | Social Media user growth rate 1314 | Total adversary volume 1316 | Unique users willing to buy artist merchandise 1318 | Unique users count willing to buy tickets 1320 | | |
| Pop | Artist-21 | 750000 | 8 | 65000 | 220 | 15% | 419 | 482 | 935 | 0.87 | Contract-worthy |
| Pop | Artist-31 | 2000 | 3 | 80 | 17 | -5% | 400 | 0 | 7 | 0.21 | Not Contract-worthy |
| Pop | Artist-41 | 150000 | 6 | 25000 | 89 | 11% | 205 | 73 | 243 | 0.77 | Contract-worthy |
| Pop | Artist-51 | 15000 | 4 | 120 | 50 | -7% | 528 | 3 | 78 | 0.46 | Not Contract-worthy |
| Pop | Artist-61 | 72000 | 5 | 80 | 24 | -25% | 1720 | 14 | 12 | 0.57 | Not Contract-worthy |

METHOD AND SYSTEM FOR EVALUATING CONTRACT WORTHINESS OF PERFORMING ARTISTS

CROSS-REFERENCE TO RELATED APPLICATION

This application claims priority to Indian Patent Application No. 202241070841, filed on Dec. 8, 2022, which is hereby incorporated by reference in its entirety.

Generally, the invention relates to talent scouting. More specifically, the invention relates to method and system for evaluating contract worthiness of performing artists.

BACKGROUND

Talent scouting is most commonly technique used in artist management industry for identifying performing artists (for example, a musician, a stand-up comedian, or an actor) from digital platforms. At present, record labels globally invest billions of dollars towards scouting new and upcoming music talents who are likely to be future stars and investing in potential music artists by offering a contract. Key investment areas may be on-boarding expert artists and repertoire (A&R) team, supporting new artists, global coordination towards identifying markets for promoting artists, or growing artist fan base across multiple countries. In view of high return of investment (ROI), record labels may primarily explore unsigned new and upcoming music artists with significantly trending follower base or revenue potential. In parallel, music artists may prefer web and social media platforms which may act as effective and cost-efficient tools for music talents to engage with fans, grow their fan-base, post campaigns related to their songs, albums, or event tickets, and to highlight their discography or personal details.

The existing talent scouting techniques are based on online streaming platforms, internet radio subscriptions, or other online subscription data. However, the existing talent scouting techniques are manually intensive in which A&R experts are required to manually perform contract worthiness analysis for selected artists based on multiple trend charts and high-level social media metrics, such as, overall user count, overall views, location-wise user distribution, and alike, which may bias assessment result. For an instance, during manual assessment of music artists, the A&R experts may assume equal influence of all the aspects of music artist such as, but not limited to, music talent, persona, event participation, and future revenue potential. However, the manual analysis may not consider social user/follower segments for selecting talented music artists which may be worthy for contract offering, since all followers in social media may not be fans. Additionally, the performing artists may want to monitor their and other artist's social presence and contract worthiness to enhance their chances of high value contract signing.

Therefore, to minimize investment risk, there exists a need for techniques that provide solutions to analyze contract worthiness of performing artists by factoring artist's social user engagement behavior over social media platforms and scoring artists in terms of artistic quality, popularity, and commercial potential during their journey.

SUMMARY

In one embodiment, a method for evaluating contract-worthiness of performing artists is disclosed. The method may include receiving consolidated data corresponding to each of a set of performing artists from one or more data sources. The consolidated data may include text data and a plurality of metrics from a plurality of digital platforms. The method may further include processing the consolidated data. The processing of the consolidated data may include classifying a set of topics in the text data into a plurality of categories through a Machine Learning (ML) classification model, determining, for at least one of the plurality of categories, one or more user engagement behavior segments based on sentiment scores associated with the text data, the sentiment scores is determined using an ML sentiment analysis model, and determining a plurality Key Performance Indicators (KPIs) based on the plurality of metrics, the plurality of categories, and the one or more user engagement behavior segments. Further, the method may include calculating a contract worthiness score for each of the set of performing artists based on the plurality of KPIs using a trained ML contract worthiness scoring model. The method may further include evaluating one or more of the set of performing artists for their contract worthiness based on the contract worthiness score and a threshold contract worthiness score. The threshold contract worthiness score may be determined based on a historical distribution of contract worthiness scores for the trained ML contract worthiness scoring model.

In another embodiment, a system for evaluating contract-worthiness of performing artists is disclosed. The system may include a processor and a memory communicatively coupled to the processor. The memory store processor-executable instructions, which, on execution, cause the processor to receive consolidated data corresponding to each of a set of artists from one or more data sources. The consolidated data may include text data and a plurality of metrics from a plurality of digital platforms. The processor-executable instructions, on execution, may further cause the processor to process the consolidated data. For processing the consolidated data, the processor-executable instructions, on execution, may cause the processor to classify a set of topics in the text data into a plurality of categories through a Machine Learning (ML) classification model, determine, for at least one of the plurality of categories, one or more user engagement behavior segments based on sentiment scores associated with the text data, the sentiment scores is determined using an ML sentiment analysis model, and determine a plurality Key Performance Indicators (KPIs) based on the plurality of metrics, the plurality of categories, and the one or more user engagement behavior segments. The processor-executable instructions, on execution, may further cause the processor to calculate a contract worthiness score for each of the set of performing artists based on the plurality of KPIs using a trained ML contract worthiness scoring model. The processor-executable instructions, on execution, may further cause the processor to evaluate one or more of the set of performing artists for their contract worthiness based on the contract worthiness score and a threshold contract worthiness score. The threshold contract worthiness score may be determined based on a historical distribution of contract worthiness scores for the trained ML contract worthiness scoring model.

In yet another embodiment, a non-transitory computer-readable medium storing computer-executable instruction for evaluating contract-worthiness of performing artists is disclosed. The stored instructions, when executed by a processor, may cause the processor to perform operations including receiving consolidated data corresponding to each of a set of artists from one or more data sources. The consolidated data may include text data and a plurality of metrics from a plurality of digital platforms. The operations further include processing the consolidated data. The processing of the consolidated data may include classifying a set of topics in the text data into a plurality of categories through a Machine Learning (ML) classification model, determining, for at least one of the plurality of categories, one or more user engagement behavior segments based on sentiment scores associated with the text data, the sentiment scores is determined using an ML sentiment analysis model, and determining a plurality Key Performance Indicators (KPIs) based on the plurality of metrics, the plurality of categories, and the one or more user engagement behavior segments. Further, the operations include calculating a contract worthiness score for each of the set of performing artists based on the plurality of KPIs using a trained ML contract worthiness scoring model. The operations further include evaluating one or more of the set of performing artists for their contract worthiness based on the contract worthiness score and a threshold contract worthiness score. The threshold contract worthiness score may be determined based on a historical distribution of contract worthiness scores for the trained ML contract worthiness scoring model.

It is to be understood that both the foregoing general description and the following detailed description are exemplary and explanatory only and are not restrictive of the invention, as claimed.

BRIEF DESCRIPTION OF THE DRAWINGS

The present application can be best understood by reference to the following description taken in conjunction with the accompanying drawing figures, in which like parts may be referred to by like numerals.

FIG. 3 is an exemplary table illustrating extracted social media data, in accordance with an embodiment.

FIGS. 6A and 6B illustrate an exemplary table illustrating an exemplary set of keywords for training ML classification model, in accordance with an embodiment.

FIG. 6C is an exemplary table illustrating tagging a set of keywords with relevant set of topics, in accordance with an embodiment.

FIG. 6D is an exemplary table illustrating assigning of relevant topics to corresponding authors based on analysis of content type, in accordance with an embodiment.

FIG. 6E is an exemplary table depicting an application of ML model in conjunction with rule-based categorization for considering appropriate textual data and discarding irrelevant textual data, in accordance with an embodiment.

FIGS. 7A and 7B illustrate a table representing an exemplary set of keywords for training multimedia topic classification ML model, in accordance with an embodiment.

FIGS. 10A and 10B illustrate an exemplary table of output data obtained from rule based multimedia content description categorization, in accordance with an embodiment.

FIGS. 12A, 12B, and 12C illustrate an exemplary table representing information corresponding to a plurality of KPIs, in accordance with an embodiment.

FIG. 13 illustrates an exemplary table of output data obtained from information exploration analysis, in accordance with an embodiment.

FIG. 14 is an exemplary table illustrating analytical data for developing the contract worthiness prediction model, in accordance with an embodiment.

FIG. 15A is an exemplary table illustrating contract worthiness scores assigned to a set of performing artists, in accordance with an embodiment.

FIG. 16 is an exemplary table illustrating a set of performing artists with their corresponding contract worthiness score, in accordance with an embodiment.

DETAILED DESCRIPTION OF THE DRAWINGS

The following description is presented to enable a person of ordinary skill in the art to make and use the invention and is provided in the context of particular applications and their requirements. Various modifications to the embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art will realize that the invention might be practiced without the use of these specific details. In other instances, well-known structures and devices are shown in block diagram form in order not to obscure the description of the invention with unnecessary detail. Thus, the invention is not intended to be limited to the embodiments shown but is to be accorded the widest scope consistent with the principles and features disclosed herein.

While the invention is described in terms of particular examples and illustrative figures, those of ordinary skill in the art will recognize that the invention is not limited to the examples or figures described. Those skilled in the art will recognize that the operations of the various embodiments may be implemented using hardware, software, firmware, or combinations thereof, as appropriate. For example, some processes can be carried out using processors or other digital circuitry under the control of software, firmware, or hardwired logic. (The term "logic" herein refers to fixed hardware, programmable logic and/or an appropriate combination thereof, as would be recognized by one skilled in the art to carry out the recited functions.) Software and firmware can be stored on computer-readable storage media. Some other processes can be implemented using analog circuitry, as is well known to one of ordinary skill in the art. Additionally, memory or other storage, as well as communication components, may be employed in embodiments of the invention.

Figure 1:
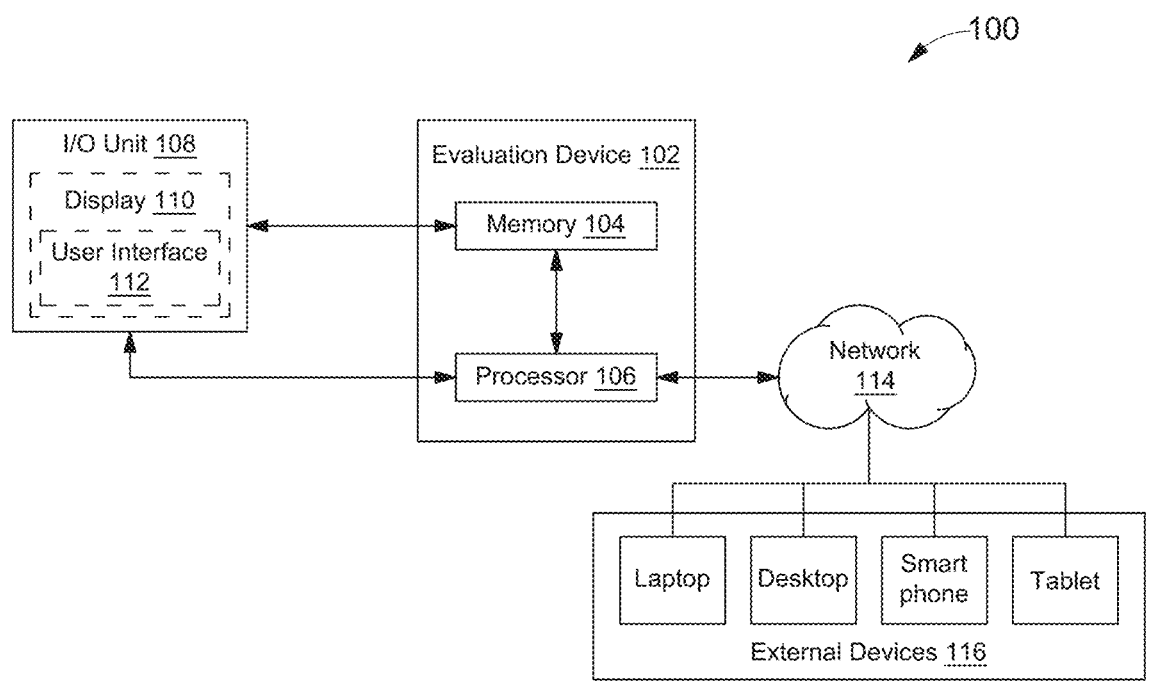
FIG. 1 is a block diagram illustrating a system for evaluating contract worthiness of performing artists, in accordance with an embodiment.

Referring now to FIG. 1, a block diagram of a system 100 for evaluating contract worthiness of performing artists is illustrated, in accordance with an embodiment. The term "contract worthiness" may be referred to a particular artist (for example, a music artist, a stand-up comedian, or an actor) that may be worth in signing a contract due to artist's ability to generate significant fan following and future revenue, by turning out to be a successful artist in future. The system 100 may include an evaluation device 102 that may be configured to evaluate contract worthiness of performing artists. In particular, the evaluation device 102 may analyze text data (for example, social media text data) from a plurality of digital platforms to select a set of artists that may be worthy for contract offering.

Examples of the evaluation device 102 may include, but are not limited to, a server, a desktop, a laptop, a notebook, a tablet, a smartphone, a mobile phone, an application server, or the like. The plurality of digital platforms may be websites and social media platforms. The text data may correspond to user comments on each of performing artist posts and multimedia content description associated with each of the plurality of social media platforms.

The evaluation device 102 may include a memory 104, a processor 106, and an input/output (I/O) unit 108. The memory 104 may store instructions that, when executed by the processor 106, cause the processor 106 to evaluate contract worthiness of performing artists. As will be described in greater detail in conjunction with FIG. 2 to FIG. 21, in order to evaluate the contract worthiness, the processor 106 in conjunction with the memory 104 may perform various functions including receiving consolidated data corresponding to each of a set of performing artists from one or more data sources, processing the consolidated data, calculating a contract worthiness score for each of the set of performing artists and evaluating one or more of the set of performing artists for their contract worthiness based on the contract worthiness score and a threshold contract worthiness score.

The memory 104 may also store various data (e.g., web text data, social media text data, web metrics, social media metricies, consolidated data corresponding to the performing artists, contract worthiness score and threshold contract worthiness score, etc.) that may be captured, processed, and/or required by the evaluation device 102. The memory 104 may be a non-volatile memory (e.g., flash memory, Read Only Memory (ROM), Programmable ROM (PROM), Erasable PROM (EPROM), Electrically EPROM (EEPROM) memory, etc.) or a volatile memory (e.g., Dynamic Random Access Memory (DRAM), Static Random-Access memory (SRAM), etc.). The memory 104 may further include various modules that enables the evaluation device 102 to evaluate contract worthiness of the performing artists. These modules are explained in detail in conjunction with FIG. 2

The end-user may interact with the evaluation device 102 and vice versa through the input/output unit 108 accessible via a display 110 and a user interface 112. By way of an example, the display 110 may be used to display results (i.e., the set of performing artists with their contract worthiness score, performing artist details and a plurality of charts corresponding to each of the set of performing artists, etc.) based on actions performed by the evaluation device 102, to the end-user (i.e., recording industry, music industry, film industry, etc.

By way of another example, the user interface 112 may be used by a user to provide inputs to the evaluation device 102. Thus, for example, in some embodiments, the user may ingest an input via the user interface 112 of the evaluation device 102. The input may include a user-defined art domain (i.e., whether the required performing artists is a music artist, a comedian, or an artist from any other domain) of which the contract worthiness is to be evaluated. Based on the input, the evaluation device 102 may evaluate the contract worthiness of the performing artists and share this information with the end-user via the user interface 112.

The evaluation device 102 may also interact with external devices 116 over a network 114 for sending and receiving data. The external devices 116 may be used by the plurality of end users to access the evaluated contract worthiness of the performing artists from the evaluation device 102. Examples of the external devices 116 may include, but are not limited to, computer, tablet, smartphone, and laptop. The network 120, for example, may be any wired or wireless communication network and the examples may include, but may be not limited to, the Internet, Wireless Local Area Network (WLAN), Wi-Fi, Long Term Evolution (LTE), Worldwide Interoperability for Microwave Access (WiMAX), and General Packet Radio Service (GPRS).

Figure 2:
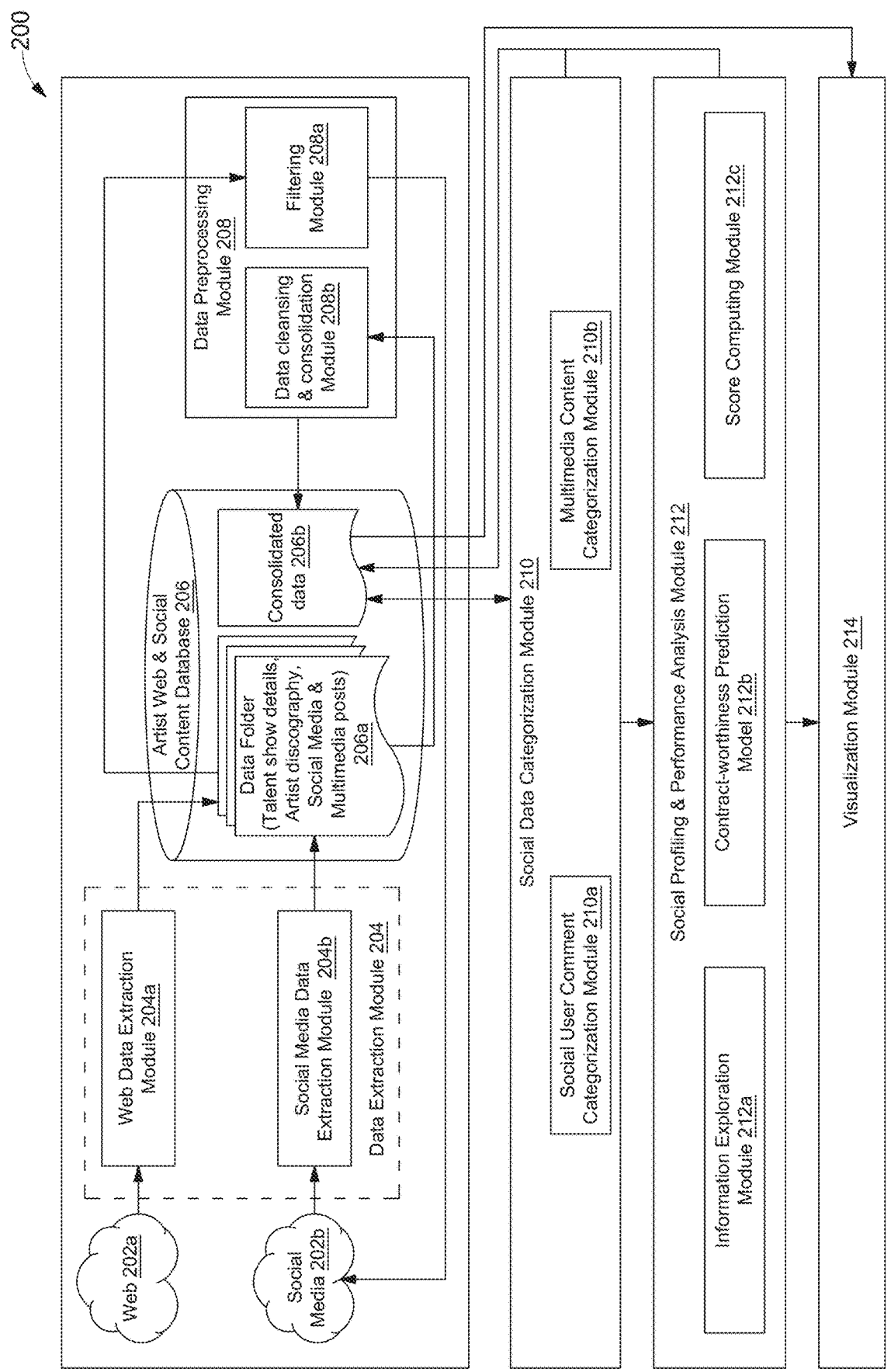
FIG. 2 is a block diagram illustrating various modules within the memory of a evaluating device configured to evaluate contract worthiness of performing artists, in accordance with an embodiment.

Referring now to FIG. 2, a block diagram 200 of various modules within the memory 104 of the evaluating device 102 is illustrated, in accordance with an embodiment. The evaluation device 102 may include a data extraction module 204, a database 206, a data pre-processing module 208, a social data categorization module 210, a social profiling and performance analysis module 212, and a visualization module 214. The data extraction module 204 may further include a web text extraction module 204a and a social media text extraction module 204b.

In order to evaluate the contract worthiness of performing artists, initially, the web text extraction module 204a may extract web text data from at least one of a plurality of websites (for example, websites 202a, and social media 202b). The web text data may correspond to a plurality of performing artists. It should be noted that the web text data may be extracted based on a user-defined art domain. By way of an example, in case when the user-defined art domain is a music artist, then the web text data may be extracted from one of music talent shows from the plurality of websites (e.g., talent show websites, and blogs).

In some embodiments, the web text extraction module 204a may further configured to extract the web text data and a plurality of web metrics corresponding to each of the set of performing artists from the plurality of websites. The web text data extracted corresponding to each of the set of performing artists may include, but are not limited to, music genre popularity, genre-wise all the music artists who got popular over the recent years, genre-wise all the famous music artists, major record labels, or radio stations. The plurality of web metrics corresponding to each of the set of performing artists may be, for example, overall rank, count of single releases, count of album releases of each of the set of performing artists. As will be appreciated by those skilled in the art, the web text data extraction may be done using standard/open-source Application Programming Interface (API's). The websites may provide data regarding name and ranking of contestants/winners, personal details, discography of individual contestants including release dates, and alike.

Further, the pre-processing module 208 may include a filtering module 208a and a data cleansing and consolidation module 208b. The filtering module 208a may be configured to apply a predefined filtering criteria on the web text data to identify a set of performing artists from the plurality of performing artists. The predefined filtering criteria may be, for example, social media text data extraction rules that may be defined specifying genre-wise list of contestants from individual music talent shows and duration of required social data. Start and end dates of the duration of social data covers all the phases of music artist journey.

In some embodiments, the web text data may be pre-processed to merge each of the web text data into a single file that may include fields, such as, but not limited to, music talent show name, season name, season start date, season finale date, music artist (for example, contestant) name, age, gender, genre, overall rank, last date of appearance on music talent show, count of single releases, count of album releases, debut song name, debut song release date, first album name, first album release date, names & release dates of subsequent singles and albums. Additionally, the web text data pre-processing may also include mapping music artist journey and specifying key phases i.e., pre or during event phase and post-event phase. An event implies first major event when the artist got social media virality e.g., winning a music event, release of viral video with 100K+ views. The event date may be tagged to music artists according to their first major event. The objective of music artist journey mapping may be to group social media data and analyze pre/during-versus post-event social engagement behavior, user volume trend, etc.

Based on the predefined filtering criteria, the social media text extraction module 204b may extract social media text data and a plurality of social media metrics corresponding to each of the set of performing artists from the plurality of social media platforms. It may be noted that the social media text data extraction rules may trigger social media data extraction for each of the identified set of performing artists.

The extracted social media data is illustrated in FIG. 3 via an exemplary table 300. The table 300 may include exemplary social media data fields that is extracted from social media and multimedia platforms. The social media data fields may include article Id 302, external author Id 304, author 306 (indicating social username/user handle name), headline 308 (required for multimedia content), content 310, media provider 312, region 314, comment publishing date 316, and post type 318.

Referring back to FIG. 2, once the text data (for example, web text data and social media text data) and the plurality of metrics (for example, plurality of web metrics and plurality of social media metrics) extracted from the plurality of digital platforms, these extracted text data may be further stored in a text data folder 206a of the database 206.

For each of the set of performing artists, the web text data, the social media text data, the plurality of web metrics, and the plurality of social media metrics extracted may further be consolidated via the consolidation module 208a to obtain the consolidated data. It may be noted that the consolidation may be performed to segregate a duplicate and/or fake follower comments from true follower comments on each post of the set of performing artists. In some embodiments, the data cleansing and consolidation module 208a may consolidate the social media text data that may include, but are not limited to, discarding records without any comments, relevant social data fields selection, Geo/language filtering (if required), appending periodic social data files, and arranging social media data in alphabetical order of author. Relevant social data fields may include, but are not limited to, article Id, external author Id, author (indicating social username/user handle name), headline (required for multimedia content), content, username mentioned, comment publishing date. Author handles/usernames are pertaining to music artist themselves, record companies, music talent shows, event organizers, other peer music artists, other users. Author field help in identifying music artist related social media campaigns. Output of social media data pre-processing may be referenced hereafter as final social media data metrices. Further, final web and social media data metrices to be merged, and the merged metrices may be referenced hereafter as consolidated data 206b.

Once the web text data, the social media text data, the plurality of web metrics, and the plurality of social media metrics is consolidated, the consolidated data 206b may further be processed. The processing of the consolidated data 206b may include identification of a plurality of keywords in the consolidated data using one or more natural language processing models. The one or more natural language processing models may be one of a Long Short-Term Memory (LSTM) model, Naive Bayes model, Support Vector Machine (SVM), Random Forest model.

Once the plurality of keywords is identified, each of the plurality of keywords may further classified into one or more set of keywords. The set of keywords may further be used as input dataset to train a Machine Learning (ML) classification model. The trained ML classification model may further classify each of the set of keywords into relevant set of topics. The processing may further include classification of the set of topics in the text data into a plurality of categories through the trained ML classification model via the categorization module 210. The plurality of categories may include a plurality of user comment categorization and a plurality of multimedia content description categorization. It should be noted the plurality of keywords may be classified into a category of the plurality of user comment via a social media user comment categorization module 210a and the plurality of keywords may be classified into a category of the plurality of multimedia content description via a multimedia label categorization module 210b. The process of categorization is further explained in greater detail in conjunction with FIG. 4A.

Further, the processing of the consolidated data 206b may include, for at least one of the plurality of categories, one or more user engagement behavior segments may be determined based on sentiment scores associated with the text data. The sentiment scores may be determined using an ML sentiment analysis model.

The social profiling and performance analysis module 212 may include an information exploration module 212a, a contract worthiness prediction model 212b and a score computing module 212c. Based on the plurality of metrics, the plurality of categories, and the one or more user engagement behavior segments, a plurality Key Performance Indicators (KPIs) may be determined through the feature exploration module 212a. The plurality of KPIs may include at least one of artist social presence related-KPIs, artist talent quality and persona-related KPIs, social media user-related KPIs, and future commercial viability-related KPIs.

Further, the score computing module 212c may be configured to calculate a contract worthiness score for each of the set of performing artists based on the plurality of KPIs using a trained ML contract worthiness scoring model. It should be noted that the trained ML contract worthiness scoring model may be generated by the contract worthiness prediction model 212b. In particular, the contract worthiness prediction model 212b may be responsible to train a set of ML models and based on training, selecting an optimum ML model from the set of trained ML models in order to generate the trained ML contract worthiness scoring model. The process of creating KPIs and generating the trained ML contract worthiness scoring model is explained in detail in conjunction with FIG. 12.

Once the contract worthiness score is calculated, the social profiling and performance analysis module 212 may further configured to evaluate one or more of the set of performing artists for their contract worthiness based on the contract worthiness score and a threshold contract worthiness score. It should be noted that the threshold contract worthiness score may be determined based on a historical distribution of contract worthiness scores for the trained ML contract worthiness scoring model.

Further, the visualization module 214 may be configured to visualize performing artist details and a plurality of charts corresponding to each of the one or more of the set of performing artists via a Graphical User Interface (GUI). The performing artist details may include the contract worthiness score, the assigned rank, and a geographical location, and the plurality of charts may be based on the plurality of KPIs, the plurality of social media metrics, the one or more user engagement behavior segments, and the plurality of categories. The visualization of performing artist details and the plurality of charts is illustrated via FIGS. 18 to 20.

It should be noted that all such aforementioned modules 202-214 may be represented as a single module or a combination of different modules. Further, as will be appreciated by those skilled in the art, each of the modules 202-214 may reside, in whole or in parts, on one device or multiple devices in communication with each other. In some embodiments, each of the modules 202-214 may be implemented as dedicated hardware circuit including custom application-specific integrated circuit (ASIC) or gate arrays, off-the-shelf semiconductors such as logic chips, transistors, or other discrete components. Each of the modules 202-214 may also be implemented in a programmable hardware device such as a field programmable gate array (FPGA), programmable array logic, programmable logic device, and so forth. Alternatively, each of the modules 202-214 may be implemented in software for execution by various types of processors (e.g., processor 106). An identified module of executable code may, for instance, include one or more physical or logical blocks of computer instructions, which may, for instance, be organized as an object, procedure, function, or other construct. Nevertheless, the executables of an identified module or component need not be physically located together but may include disparate instructions stored in different locations which, when joined logically together, include the module, and achieve the stated purpose of the module. Indeed, a module of executable code could be a single instruction, or many instructions, and may even be distributed over several different code segments, among different applications, and across several memory devices.

Figure 4A:
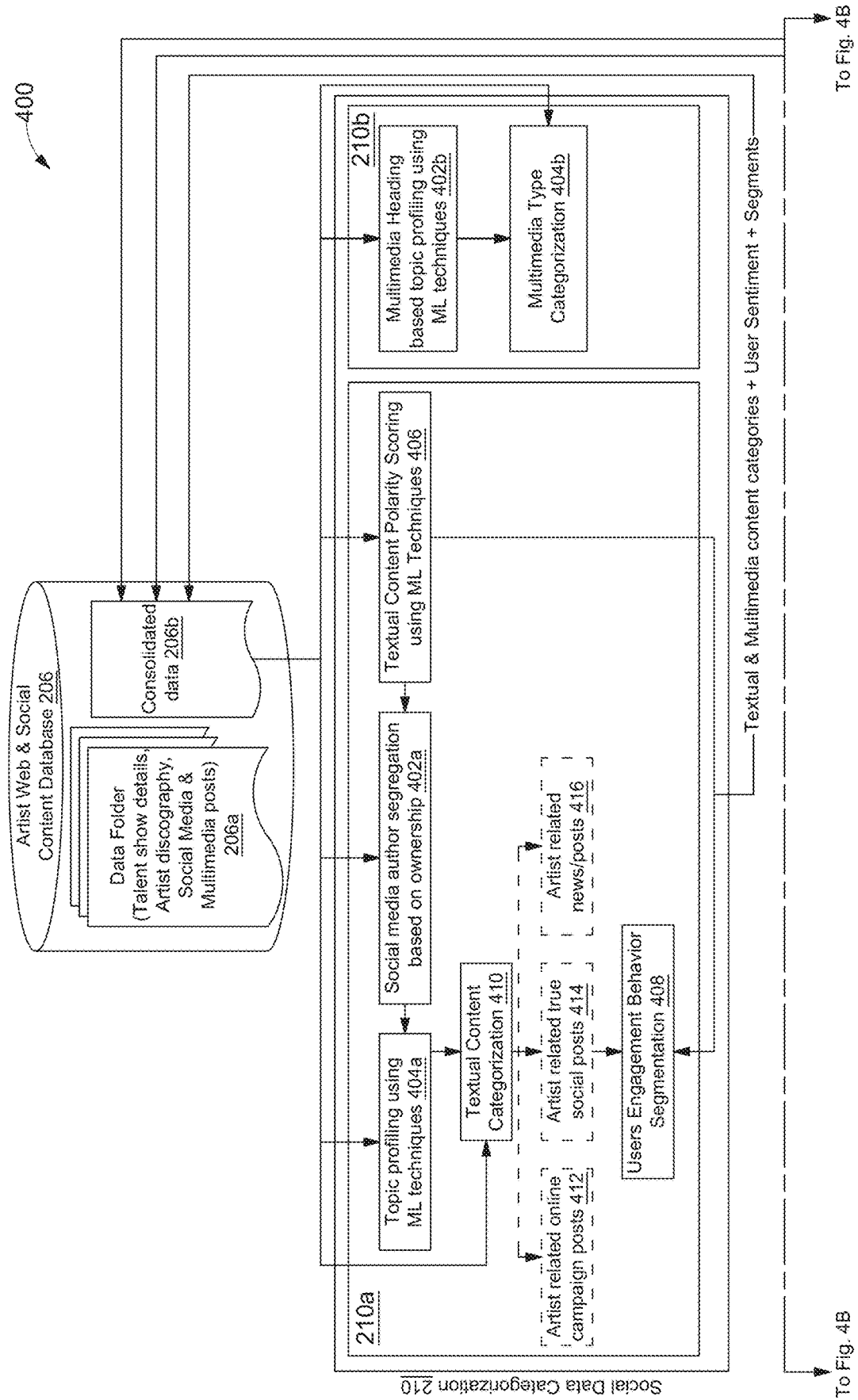
FIGS. 4A and 4B illustrate a block diagram of a process flow for user comment categorization and multimedia content description categorization in accordance with an embodiment.
Figure 4B:
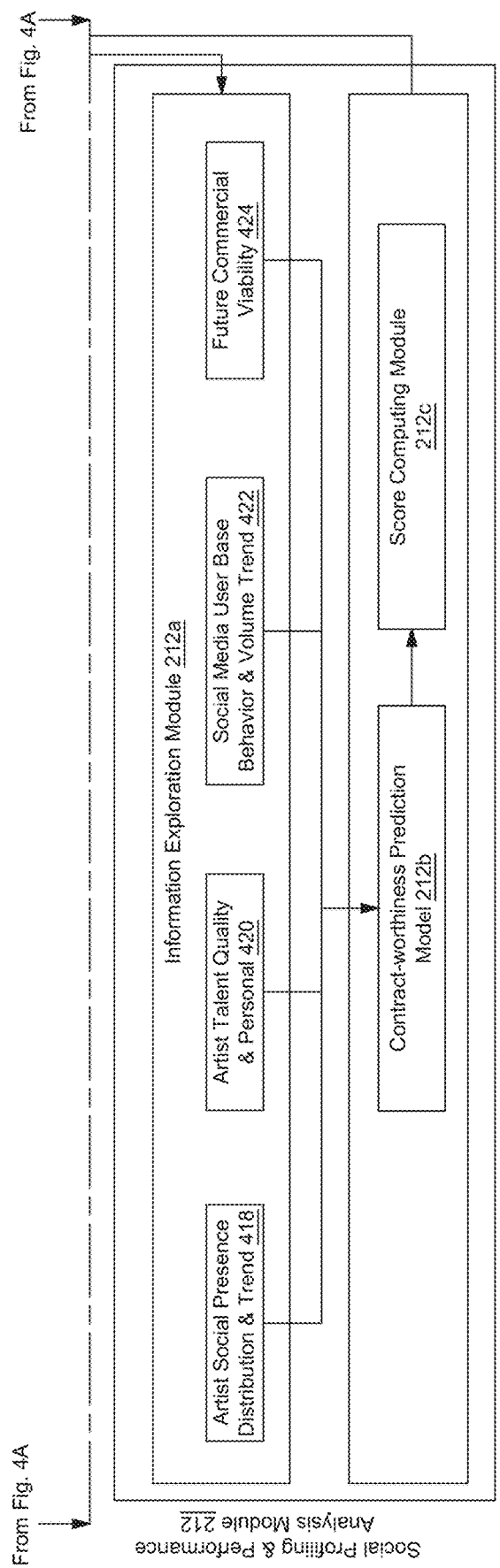

Referring now to FIGS. 4A and 4B, a block diagram 400 of a process flow for user comment categorization and multimedia content description categorization is illustrated, in accordance with an embodiment of the present disclosure. The block diagram 400 may include the database 206, the social data categorization module 210, and the social profiling and performance analysis module 212. The social data categorization module 210 may include the social media user comment categorization module 210a and the multimedia content categorization module 210b. The social profiling and performance analysis module 212 may include the information exploration module 212a, the contract worthiness prediction model 212b, and a score computing module 212c.

To initiate the user comment categorization and the multimedia content description categorization, firstly the consolidated data 206b from the database 206 may be inputted to the social data categorization module 210. Further, the plurality of topics in the text data may be classified into a plurality of categories via the categorization module 210. The text data may include user comment and multimedia content description. The plurality of categories may include a plurality of user comment categorization (for example, social media user comment categorization) and a plurality of multimedia content description categorization (for example, multimedia content title/heading label categorization). The multimedia content may correspond to one of livestream videos, live performance videos, talent show videos, reaction videos, biography videos, fan-made video, voice coach, or official music video of each of the one or more performing artists.

It should be noted that for the social media user comment categorization and the multimedia content description categorization, the social media user comment categorization module 210a and the multimedia label categorization module 210b may be executed in-parallel. For example, in order to perform the social media user comment categorization, initially, a social media author may be segregated based on account ownership using a plurality of rules, at block 402a. Further, a topic profiling may be done on each of the segregated social media account using ML techniques, at block 404a. The account ownership may correspond to one of a performing artist owned social media account, an associate partner owned social media account, and a celebrity and/or peer owned social media account. The process of topic profiling is explained conjunction with FIGS. 5A and 5B.

Similarly, the multimedia content description categorization may begin with labeling of each of the title/heading associated with the multimedia content. Based on the labeling, a topic profiling may be done on each of the labeled multimedia content using the ML model, at block 402b. Upon topic profiling, a multimedia content categorization may be done based on their content type using a plurality of rules, at block 404b. This is further explained in conjunction with FIG. 10.

The topic profiling implies creation of logical groups of words using machine learning algorithms towards stop word removal, stemming, vectorization (for example, term frequency-inverse document frequency (TF-IDF) encoding, or GloVe), and topic classification using one or more natural language processing models (for example, Long Short-Term Memory (LSTM), Naive Bayes, Support Vector Machine (SVM), or Random Forest).

In addition to the topic profiling and social media account segregation, a sentiment analysis may be performed to assess polarity of textual content using an ML sentiment analysis model, at block 406. The ML sentiment analysis model may be, for example, but are not limited to, Naive Bayes, and SVM. In the sentiment analysis, sentiment scores/polarity may be assigned to each of the social media users based on comments on the posts of the performing artists. For example, a social media user whose comment is positive may be tagged with positive sentiment score/polarity, a social media user whose comment is negative may be tagged with negative sentiment score/polarity, and a social media user whose comment is neither positive nor negative may be tagged with neutral sentiment score/polarity.

The sentiment scores/polarity may be an orientation of user sentiment (i.e., positive, negative or neutral) specific to textual content posted on social media. Based on the sentiment scores/polarity, one or more user engagement behavior segments may be determined, at block 408. The one or more user engagement behavior segments indicates a type of social media user commenting on the posts, i.e., whether the social media user is a fan, an adversary, an unbiased user, or a target social media user.

At block 410, the process of social media textual content categorization may further be executed to split social media text posts into three sub-categories i.e., performing artist related online campaign posts 412, performing artist related true social posts 414, and performing artist related news and posts 416. In some embodiments, the performing artist related true social posts 414 may be responsible for determining the one or more user engagement behavior segments. The purpose of the social media textual content categorization may be to: Identify performing artist relevant social media campaigns—these campaigns may be intended towards generating awareness about performing artist or engaging social users. Identify posts which truly are user opinions about multiple aspects of the performing artist, such as, but not limited to music talent, persona, live performance, or videos—these posts may be tagged as performing artist related true social media posts. Identify posts which may be news and posts—these may be posts may be about performing artist related news articles, such as, but not limited to "<Artist Name> to kick off conclave summer learning conference. https://t.co/abc" or personal posts distantly related to performing artist, such as, but not limited to "What do you like more your mom's homemade biscuits/cake or <Artist Name>? Please reply". Though News and post support the performing artist (music artist) in developing social media buzz. It may be noted that such posts do not represent opinion of social media users.

Once the social media user comment categorization and the multimedia content description categorization is done, the information exploration module 212a of the social profiling and performance analysis module 212 may determine a plurality KPIs associated with each of the set of performing artists, as shown in FIG. 4B. The plurality of KPIs may be at least one of performing artist social presence related-KPIs 418, performing artist talent quality and persona-related KPIs 420, social media user-related KPIs 422, and future commercial viability-related KPIs 424. Further, the contract worthiness prediction model 212b may be configured to train a set of ML models to obtain a trained ML contract worthiness scoring model. Using the trained ML contract worthiness scoring model, a contract worthiness score may be calculated for each of the set of performing artists based on the plurality of KPIs via the score computing module 212c. Based on the contract worthiness score and a threshold contract worthiness score, one or more of the set of performing artists may be evaluated for their contract worthiness.

Figure 5A:
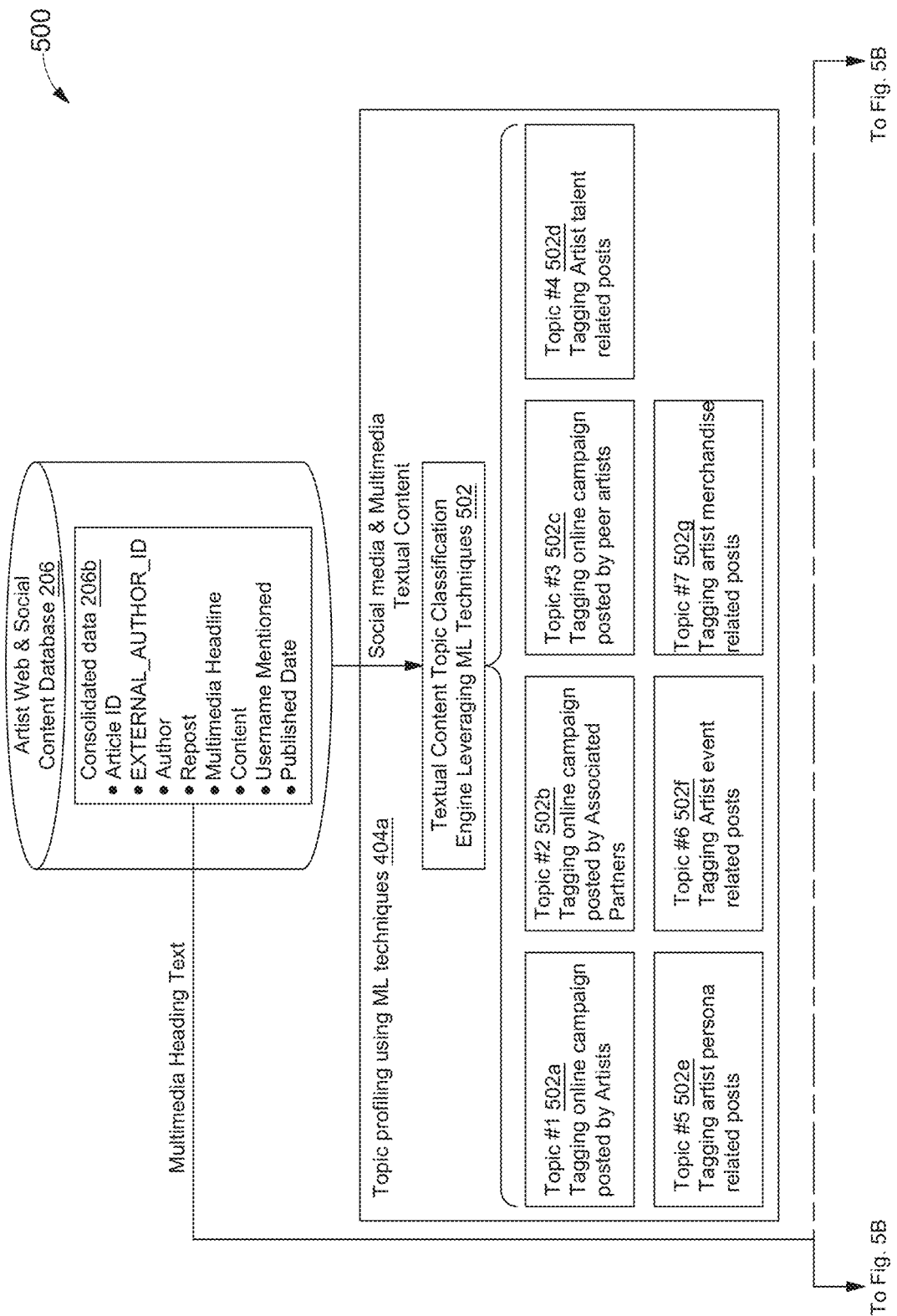
FIGS. 5A and 5B illustrate a block diagram of topic profiling for social media user comment categorization and multimedia content description categorization, respectively, in accordance with an embodiment.

Referring now to FIG. 5A, illustrates a block diagram 500 of topic profiling for social media user comment categorization, in accordance with an embodiment of the present disclosure. The block diagram 500 may include the database (for example, performing artist web and social content Database 206). The database 206 may further include the consolidated data 206b. The consolidated data may include information associated with social media text data, such as, article ID, external author ID, multimedia headline, author name, user comments on content/post, media provider name, region detail, publish date, and post type.

As mentioned earlier, in order to perform user comment categorization, the social media author is segregated based on ownership (i.e., a performing artists owned social media account, an associate partner owned social media account, and a celebrity and peer owned social media account). Further, the topic profiling may be done on each of the segregated social media account using the ML techniques, at block 404a.

In the topic profiling, initially a plurality of keywords may be identified in the consolidated data. In some embodiments, the plurality of keywords may be prestored into the database 206. Once the plurality of keywords is identified, each of the plurality of keywords may further classified into one or more set of keywords using the one or more natural language processing models. The classification of keywords may include assigning a tag to each of the plurality of keywords identified based on the social media account ownership, and the performing artist related true social media posts.

For example, as depicted in FIGS. 6A and 6B, the plurality of keywords that may be relevant to online campaign posted by performing artist may be tagged as a keyword set 1. Further, the plurality of keywords that may be relevant to online campaign posted by associated partners may be tagged as a keyword set 2. The plurality of keywords that may be relevant to online campaign posted by peer artists may be tagged as a keyword set 3. The plurality of keywords that may be relevant to performing artist talent related posts may be tagged as a keyword set 4. The plurality of keywords that may be relevant to performing artist persona related posts may be tagged as a keyword set 5. The plurality of keywords that may be relevant to performing artist event related posts may be tagged as a keyword set 6. Furthermore, the plurality of keywords that may be relevant to performing artist merchandise related posts may be tagged as a keyword set 7. These set of keywords (for example, the keyword set 1, the keyword set 2, the keyword set 3, the keyword set 4, the keyword set 5, the keyword set 6, and the keyword set 7) may further be used as input dataset to train the ML classification model (more preferably, to train a textual content topic classification ML model 502). Exemplary set of keywords for training ML classification model is illustrated in FIGS. 6A and 6B via table 600.

The Table 600 may include keyword set 602, keyword description 604, and illustrative keywords 606. The keyword set 602 may include a plurality of keyword sets (for example, a keyword set 1, a keyword set 2, a keyword set 3, a keyword set 4, a keyword set 5, a keyword set 6, and a keyword set 7). Each of the plurality of keyword sets may include corresponding keyword description and their relevant keywords. For example, the keyword set 1 may include relevant keywords that may have tagging of online campaign posted by performing artists. The relevant keywords of the keyword set 1 may include, but not limited to, "Click the link to vote", "Watch the full video here", "see the premiere of my", "Vote Now", "I will sing", "Vote for me", "love to hear your comments", "Thanks for all the support", "Are you coming? still some tickets available", "I'm so happy to tell you guys", "Thank you for having me", and "can't wait to see you there". Similarly, the keyword set 2 may include the relevant keywords that may have tagging of online campaign posted by associated partners. The relevant keywords of the keyword set 2 may include, but not limited to, "Get tickets today . . . <artist name/social media handle>", "vote for . . . <artist name/social media handle>", "Singing at the live shows . . . <artist name/social media handle>", "Tonight performing in . . . <artist name/social media handle>", "Join us . . . <artist name/social media handle>", "Tickets to see . . . <artist name/social media handle>", "Register to win tickets . . . <artist name/social media handle>","Featuring Performances by . . . <artist name/social media handle>", "Your votes saved . . . <artist name/social media handle>", "Listen to the Voice of . . . <artist name/social media handle>", and so on.

Once the ML classification model is trained using the set of keywords, the trained ML classification model may further classify each of the set of keywords into relevant set of topics. The classification may include tagging each of the set of keywords with relevant set of topics. For example, the keyword set 1 that may be relevant to online campaign posted by performing artist may be tagged as a topic #1 502a. Further, the keyword set 2 that may be relevant to online campaign posted by associated partners may be tagged as a topic #2 502b. The keyword set 3 that may be relevant to online campaign posted by peer artists may be tagged as a topic #3 502c. The keyword set 4 that may be relevant to performing artist talent related posts may be tagged as a topic #4 502d. The keyword set 5 that may be relevant to performing artist persona related posts may be tagged as a topic #5 502e. The keyword set 6 that may be relevant to performing artist event related posts may be tagged as a topic #6 502f. Furthermore, the keyword set 7 that may be relevant to performing artist merchandise related posts may be tagged as a topic #7 502g.

The process of tagging the set of keywords with relevant set of topics is illustrated via an exemplary table 600C of FIG. 6C. Table 600C includes keyword sets 612 (keyword set 1, and keyword set 2) that may be tagged with relevant topics 608. For example, a keyword set 1 may be tagged with a topic 1 which lies under topic description 610 category of online campaign posted by artists base on the trained ML classification model. Similarly, a keyword set 2 may be tagged with a topic 2 corresponding to a category of topic description 610 of online campaign posted by associated partners. Once the set of keywords is tagged with the relevant set of topics, the set of topics may further be assigned.

Referring now to FIG. 6D an exemplary table 600D representing assigning of relevant topics to corresponding authors based on analysis of content type is illustrated, in accordance with an exemplary embodiment. The table 600D includes name of authors 616, content 618 posted by the corresponding author, and assigned topic 620 to the corresponding author based on analyzing social media content type. For example, a content posted by social user-1 "My favorite contestant . . . performing at concert . . . Are you coming? still some tickets available" may be analyzed to determine topic category. Based on determining, assigning topic 1 to the social user 1 using the topic classification engine ML model.

Further, a set of rules may be defined to identify appropriate textual data and discard irrelevant textual data. For example, in order to consider social media content which may include only online campaign posted by artists, then in that case a ML model in conjunction with rule-based categorization may be applied which may consider the content posted by artist only and discarding the content which may be posted by the social user. As illustrated in FIG. 6E, an exemplary table 600E depicting an application of ML model in conjunction with rule-based categorization for considering appropriate textual data and discarding irrelevant textual data. The table 600E may include the name of author 616 with the corresponding assigned topic 620 and content 618 posted by each of the author which may be considered/discarded 622 based on defined ML based rules. It may be noted in table 600E, a ML based rule 1 is applied which may only consider the online campaign posted by artist-1 and discard the content posted by social user-1. This is further explained in conjunction with FIGS. 8A and 8B.

Figure 5B:
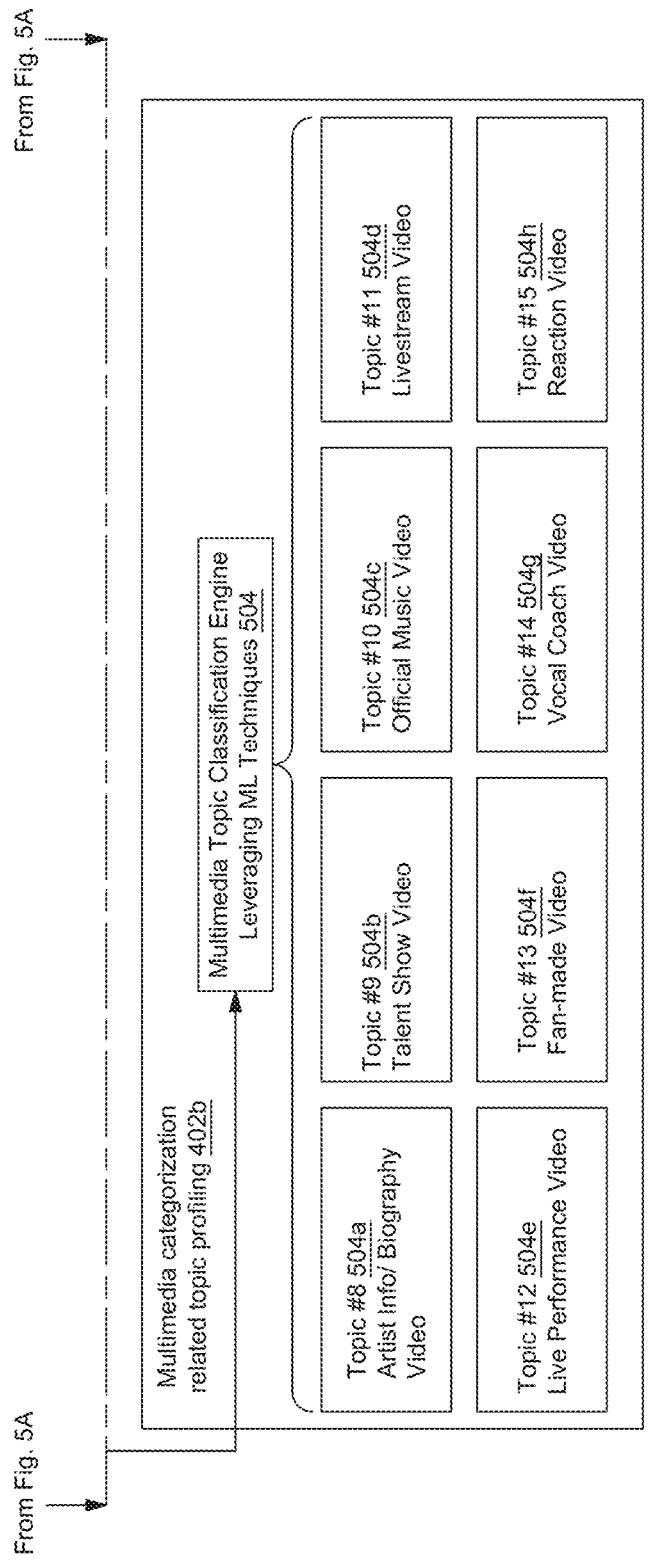

Referring now to FIG. 5B, illustrates a block diagram of topic profiling for the multimedia content description categorization, in accordance with an embodiment of the present disclosure. As the topic profiling is done for the user comment categorization, in a similar way to perform the topic profiling for the multimedia content description categorization, at block 402b, initially a multimedia content text (for example, multimedia content title/heading text) received from the consolidated data 206b may be labeled. Further, the topic profiling may be done on the labeled multimedia content text using the multimedia topic classification ML model. In the topic profiling, a plurality of keywords may be identified from the labeled multimedia content text.

Once the plurality of keywords is identified, each of the plurality of keywords may further be classified into one or more set of keywords using the one or more natural language processing models. The classification of keywords may include assigning a tag to each of the plurality of keywords identified based on types of multimedia content.

For example, as depicted in FIGS. 7A and 7B, the plurality of keywords that may be relevant to performing artist information and biography video may be tagged as a keyword set 8. Further, the plurality of keywords that may be relevant to talent show video may be tagged as a keyword set 9. The plurality of keywords that may be relevant to official music video posted by performing artists may be tagged as a keyword set 10. The plurality of keywords that may be relevant to livestream video may be tagged as a keyword set 11. The plurality of keywords that may be relevant to live performance video may be tagged as a keyword set 12. The plurality of keywords that may be relevant to fan-made video may be tagged as a keyword set 13. The plurality of keywords that may be relevant to vocal coach may be tagged as a keyword set 14. Furthermore, the plurality of keywords that may be relevant to reaction video may be tagged as a keyword set 15. These set of keywords (for example, the keyword set 8, the keyword set 9, the keyword set 10, the keyword set 11, the keyword set 12, the keyword set 13, and the keyword set 14, and keyword set 15) may further be used as input dataset to train the multimedia topic classification ML model 504). The exemplary set of keywords for training the multimedia topic classification ML model is illustrated in FIGS. 7A and 7B via table 700.

The Table 700 may include keyword set 702, keyword description 704, and illustrative keywords 706. The keyword set 702 may include a plurality of keyword sets (for example, a keyword set 8, a keyword set 9, a keyword set 10, a keyword set 11, a keyword set 12, a keyword set 13, a keyword set 14 and a keyword set 15). Each of the plurality of keyword sets may include corresponding keyword description and their relevant keywords. For example, the keyword set 8 may include keywords that may have tagging of artist Info and biography video. The relevant keywords of the keyword set 8 may include, but not limited to, "<artist name/Reference> . . . Lifestyle, Personality, Biography", "Check out my Story . . . <artist name/Reference>", "<artist name/Reference> . . . tells us about some stories", "<artist name/Reference> . . . Find Singer Celebrity Lifestyle from Video", "<artist name/Reference> . . . 5-Things to Know About The Talented Star", "The story of . . . <artist name/Reference", "<artist name/Reference> . . . Heartbreaking Story", "<artist name/Reference> . . . on What's Next After Big Win", "<artist name/Reference> . . . Detailed life journey", and "The Life of . . . <artist name/Reference> . . . interview".

Similarly, the keyword set 9 may include the keywords that may have tagging of talent show video. The relevant keywords of the keyword set 9 may include, but not limited to, "<artist name/Reference> . . . Wows the judges with . . . <Talent show reference>", "<artist name/Reference> . . . Wows the coaches with . . . <Talent show reference>", "<artist name/Reference> . . . Finale performance was speechless . . . <Talent show reference>". "<artist name/Reference>video . . . Live Finale . . . <Talent show reference>", "<artist name/Reference> . . . Live Top 10 Performances . . . <Talent show reference>", "<artist name/Reference> . . . season finale . . . <Talent show reference>", "<artist name/Reference> . . . See more on our official site . . . <Talent show reference>", "<artist name/Reference> . . . top live playoffs <Talent show reference>", "<artist name/Reference> . . . Judges Comments . . . <Talent show reference>". and "<artist name/Reference> . . . Perform Surprising Duet . . . <Talent show ref.>.

Once the multimedia topic classification ML model is trained using the set of keywords, the trained multimedia topic classification ML model may further classify each of the set of keywords into relevant set of topics. The classification may include tagging each of the set of keywords with relevant set of topics. For example, the keyword set 8 that may be relevant to performing artist information and biography video may be tagged as a topic #8 504a. Further, the keyword set 9 that may be relevant to talent show video may be tagged as a topic #9 504b. The keyword set 10 that may be relevant to official music video posted by performing artists may be tagged as a topic #10 504c. The keyword set 11 that may be relevant to livestream video may be tagged as a topic #11 504d. The keyword set 12 that may be relevant to live performance video may be tagged as a topic #12 504e. The keyword set 13 that may be relevant to fan-made video may be tagged as a topic #13 504f. The keyword set 14 that may be relevant to vocal coach may be tagged as a topic #14 504g. Furthermore, the keyword set 15 that may be relevant to reaction video may be tagged as a topic #15 504h.

Figure 8A:
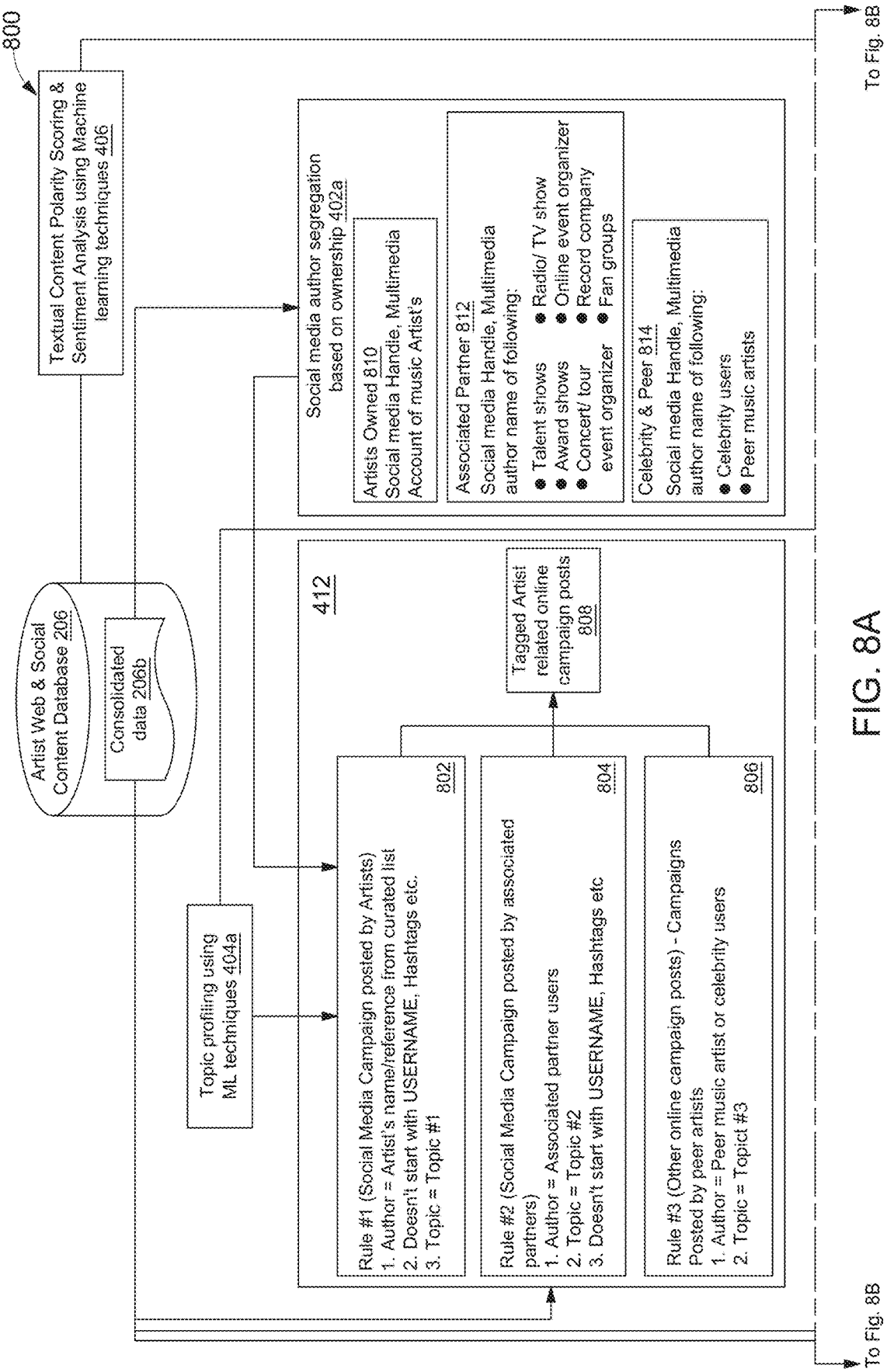
FIGS. 8A and 8B is a block diagram illustrating rule based social user comment categorization for performing artist, in accordance with an embodiment.
Figure 8B:
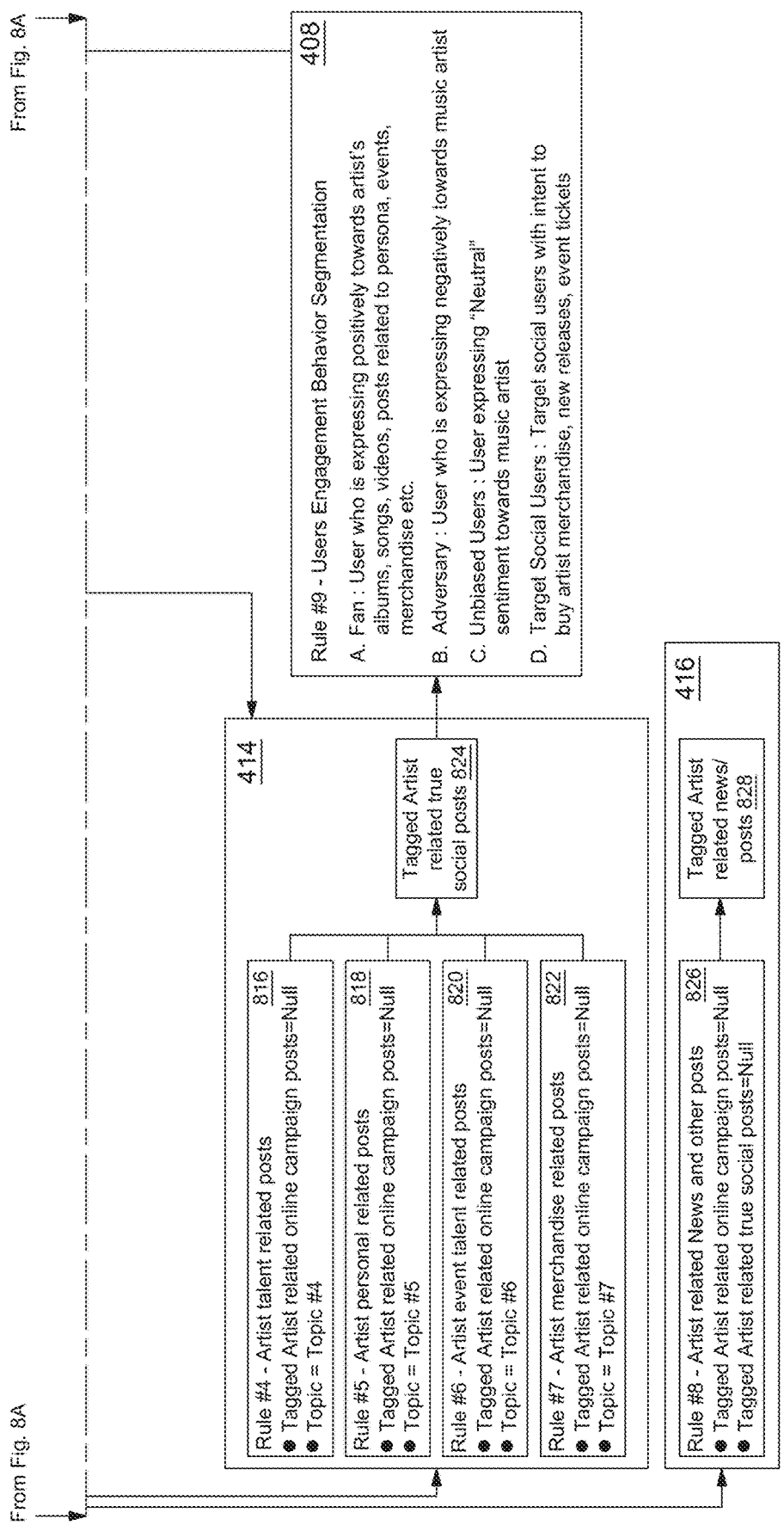

Referring now to FIGS. 8A and 8B is a block diagram 800 illustrating rule based social user comment categorization for performing artist, in accordance with an embodiment of the present disclosure. As discussed above, the social user comment categorization includes the process of social media account segregation, topic profiling, and polarity scoring and sentiment analysis. Therefore, the above-mentioned process may be executed based on a plurality of rules (preferably based on a ML model in conjunction with rule-based categorization).

As illustrated in FIG. 8A, the user comment categorization process may start with rule-1 followed by execution of rule-2 and rule-3 for identification of performing artist related online campaign posts 412, (for example, rule 1 may be executed for identification of social media campaign posted by performing artists, rule 2 may be executed for identification of social media campaign posted by associate partners, and rule 3 may be executed for identification of other online campaign posts published by peer artists), at blocks 802-806. These individual rules (for example, rule 1, rule 2, and rule 3) may act upon the disclosed conditions and respective topic profiles having set of topics (topic #1 502a, topic #2502b, and topic #3 502c), as illustrated in FIG. 5A. The outcome of rule-1 to be tagged as social media campaign posted by performing artists, at block 802. The outcome of rule-2 to be tagged as social media campaign posted by associate partners, at block 804. The outcome of rule-3 to be tagged as other online campaign posts published by peer artists, at block 806. Additionally, the outcomes from the rule-1, rule-2, and rule-3 to be aggregated and tagged as performing artist related online campaign posts, at block 808.

It may be noted that the social media account segregation based on account ownership 402a is mandatory for identification of the performing artist related online campaign posts. As illustrated in FIG. 8A, the social media account segregation may include grouping social media author names based on ownership types i.e., performing artist owned 810, associate partner owned 812, and other celebrity or peer owned 814. The associate partners and other celebrity or peer individuals often post awareness and engagement social media campaigns.

The associated partners primarily are corporates including, but not limited to, talent shows, record companies, award shows, concert/tour event organizer, radio stations. Other celebrities or peers primarily are individuals including, but not limited to, peer music artists, music industry related celebrities like musicians, composers, or judges. The social media author names to be tagged as performing artist owned, associated partner owned, and other celebrity/peer owned, with reference to web data points including, but not limited to, genre-wise all the famous music artists, major record labels, radio stations, TV music talent shows, and event management companies.

In addition to the tagging of the performing artist related online campaign category, rule-4 may be executed followed by execution of rule-5, rule-6, and rule-7 to identify performing artist related true social posts 414 (for example, rule 4 may be executed for identification of performing artist talent related posts, rule 5 may be executed for identification of performing artist persona related posts, rule 6 may be executed for identification of performing artist event related posts, and rule 7 may be executed for identification of performing artist merchandise related posts), at blocks 816-822. These individual rules (for example, rule 4, rule 5, rule 6, and rule 7) may consider topic profiles having relevant set of topics (topic #4 502d, topic #5 502e, topic #6 502f, and topic #7 502g), as illustrated in FIG. 5A. The outcome of rule-4 to be tagged as performing artist talent theme related posts, at block 816. The outcome of rule-5 to be tagged as performing artist persona theme related posts, at block 818. The outcome of rule-6 to be tagged as performing artist event theme related posts, at block 820. The outcome of rule-7 to be tagged as performing artist merchandise related posts, at block 822. Additionally, the rule-4, rule-5, rule-6, and rule-7 outcomes to be aggregated and tagged as performing artist related true social posts, at block 824, as illustrated in FIG. 8B.

In FIG. 8B, in addition to the tagging of the performing artist related true social posts, identification of performing artist related news and posts 416 may be started with execution of rule-8 considering consolidated data 206b, at block 826. The rule-8 may act upon the disclosed conditions, that may categorize textual content into "News and Post" category, at block 828.

Further, the tagged performing artist related true social posts 414 may be analyzed to determine one or more user engagement behavior segments, at block 408. In particular, rule-9 may be executed to segment social media users based on their engagement behavior sentiments and corresponding sentiment scores/polarity 406. The rule-9 act upon the disclosed conditions and sentiment score/polarity 406. The outcome of user segmentation may be segments, for example, but are not limited to fans, adversary users, unbiased users, and target social users.

The "Fans" are the social users who in general are positively opinionated about performing artist (for example, music artist). The "Adversary" social users are negatively opinionated about music artist. The "Target" social users are the social media users who mentioned an intent to buy music artist merchandise, new album, new song, etc. The "Unbiased" social users are the social users who in general are neutrally opinionated about music artist posting social posts like "<music artist 1> and <music artist 2> are dating", "For some reason I thought <music artist> did a solo tour", and alike.

Figure 9:
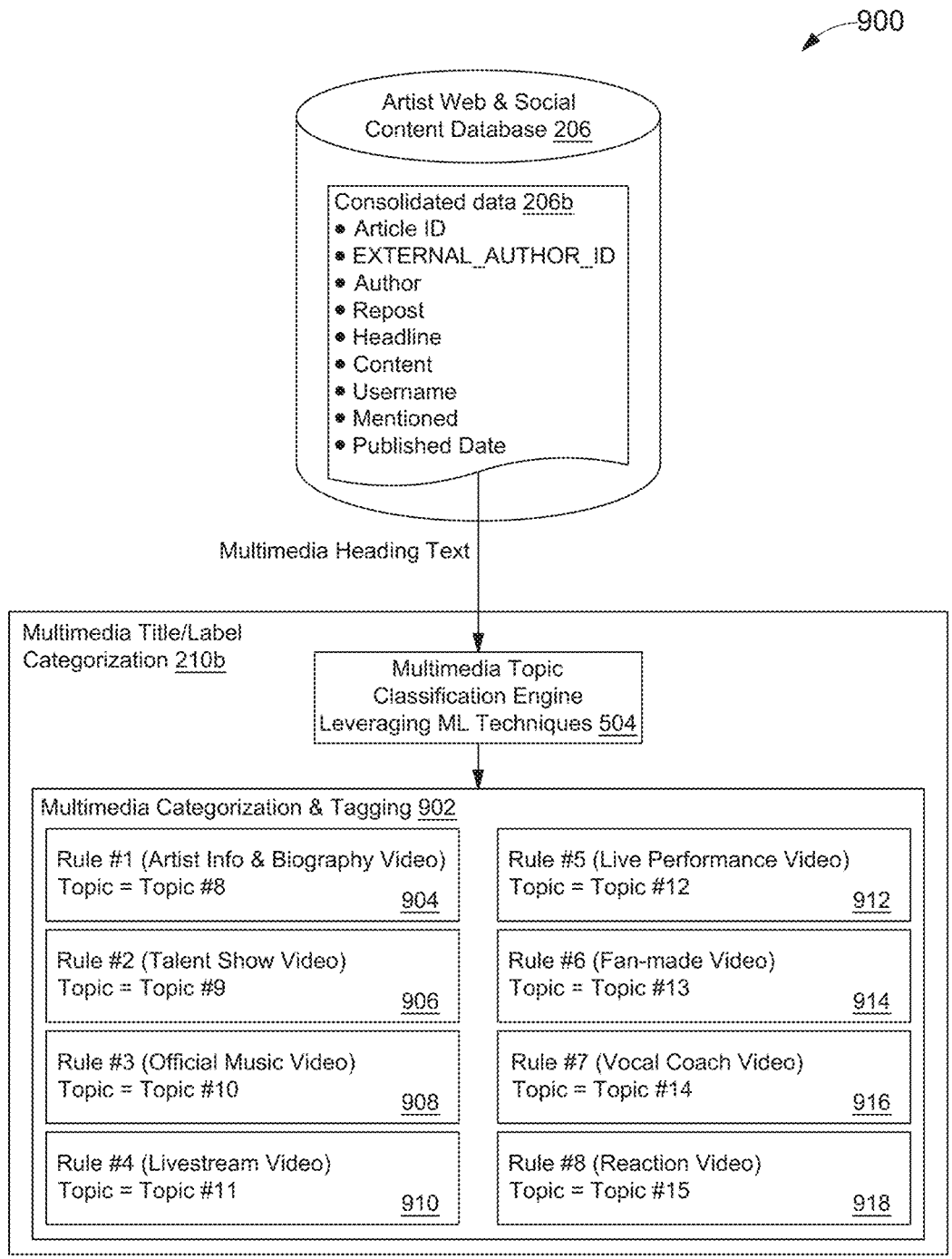
FIG. 9 is a block diagram illustrating rule based multimedia content description categorization for performing artists, in accordance with an embodiment.

Referring now to FIG. 9 is a block diagram 900 illustrating rule based multimedia content description categorization for performing artists, in accordance with an embodiment of the present disclosure. The pre-requisite for multimedia content description categorization 210b may be multimedia heading based topic profiling 402b, as illustrated in FIG. 5B. The topic profiling implies creation of logical groups of multimedia using machine learning algorithms towards stop word removal, stemming, vectorization (for example, TF-IDF encoding, and GloVe), topic classification (for example, LSTM, Naive Bayes, SVM, and Random Forest) based on music artist relevant training data. The process of topic profiling is already explained in detail in conjunction with FIGS. 5A and 5B.

The multimedia logical groups may be groups of different types of videos, such as, but not limited to artist Info and biography video, talent show video, official music video, livestream video, live performance video, fan-made video, vocal coach, and reaction video. In addition to the multimedia related topic profiles classification 504, a multimedia content categorization and tagging 902 may be start with rule-1 execution followed by execution of rule-2, rule-3, rule-4, rule-5, rule-6, rule-7, and rule-8. It may be noted that the multimedia content categorization may be done using a genre-specific ML model.

In particular, the outcome to rule-1 to be tagged as artist Info and biography video, at block 904, the outcome to rule-2 to be tagged as talent show video, at block 906, the outcome to rule-3 to be tagged as official music video, at block 908, the outcome to rule-4 to be tagged as livestream video, at block 910, the outcome to rule-5 to be tagged as live performance video, at block 912, the outcome to rule-6 to be tagged as fan-made video, at block 914, the outcome to rule-7 to be tagged as vocal coach, at block 916, and the outcome to rule-8 to be tagged as reaction video, at block 918. These individual rules i.e., rule-1, rule-2, rule-3, rule-4, rule-5, rule-6, rule-7, and rule-8 may act upon the disclosed conditions and respective set of topics (topic #8 504a, topic #9 504b, topic #10 504c, topic #11 504d, topic #12 504e, topic #13 504f, topic #14 504g, topic #15 504h), as illustrated in FIG. 5B.

Referring now FIGS. 10A and 10B, an exemplary table 1000 depicting an output of textual and multimedia content description categorization. The exemplary table 1000 may include video content genre type 1002 (for example, pop, jazz, rock, blues, etc.), performing artist name 1004, headline 1006 of the video content, author name 1008 of the video content, social media user comment 1010 on each of the video content posted, publish date 1012 of the video content, media provider 1014, video category 1016 (i.e., whether the video content is official music video of performing artist, fan-made video, talent show video, reaction video, or live performance video), performing artist journey phase 1018 (i.e., video content post-popularity), social media comment category 1020 (i.e., whether the social media user comment is relevant to true social posts, or online campaign posts), theme 1022 (i.e., whether the social media user comment is relevant to performing artist talent related posts, performing artist persona related posts, performing artist event related posts, or online campaign related posts), sentiment 1024 (i.e., positive, negative, or neutral), follower type 1026 (fan, adversary, or target social user).

Figure 11:
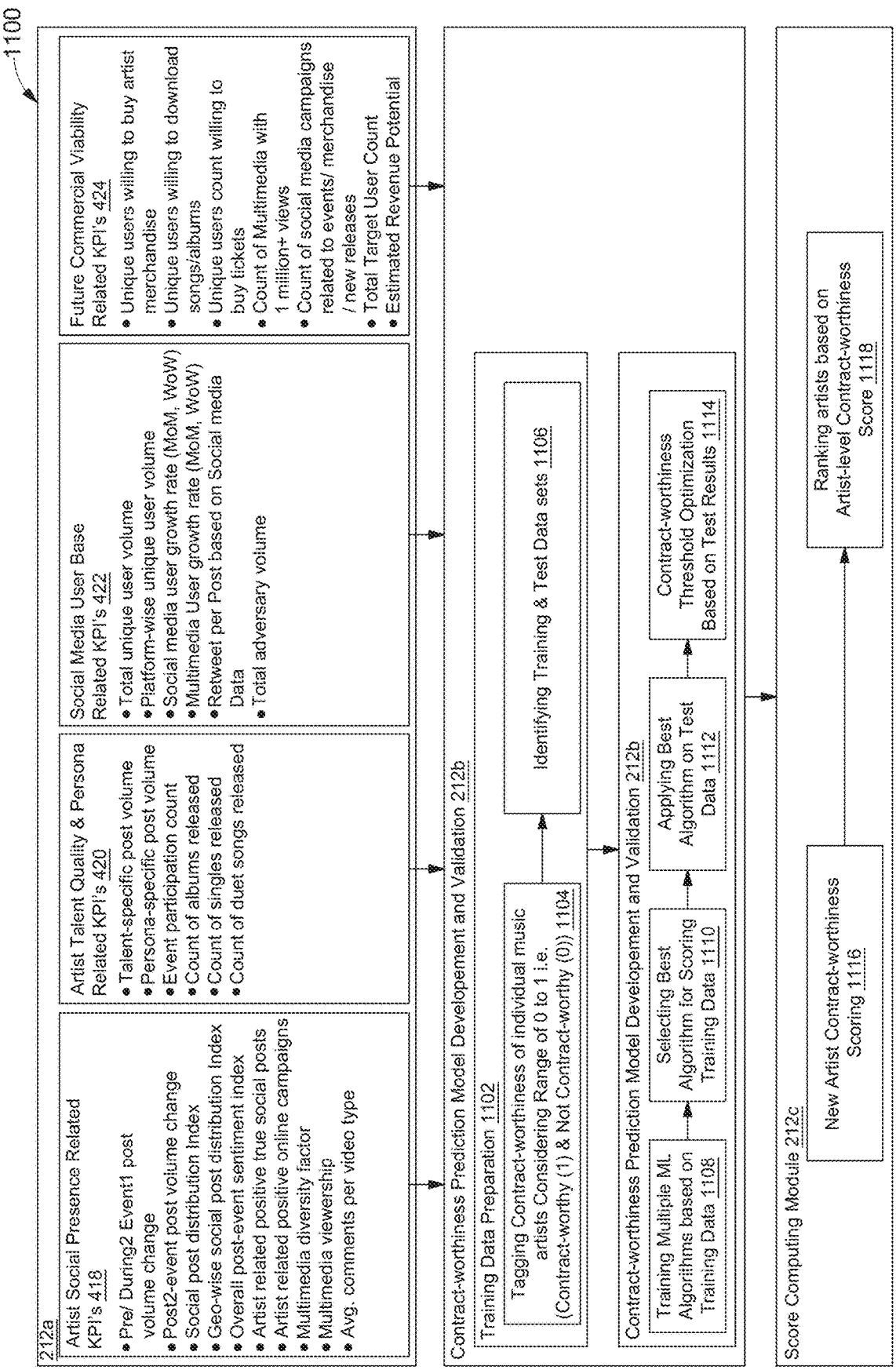
FIG. 11 illustrates a detailed block diagram for evaluating contract worthiness of performing artists, in accordance with an embodiment.

Referring now to FIG. 11, a detailed block diagram 1100 for evaluating contract worthiness of performing artists is illustrated in accordance with an embodiment of the present disclosure. Once the social user comment categorization and multimedia content description categorization is done, then the process may be directed to the social profiling and performance analysis module 212 that may be responsible for the information exploration, contract worthiness prediction model development and analysis, and contract worthiness scoring analysis for evaluating contract worthiness of performing artists via the information exploration module 212a, the contract worthiness prediction model 212b, and the score computing module 212c, respectively.

The information exploration module 212a may be configured to formulate and calculate a plurality of KPIs, but not limited to, performing artist social presence related-KPIs 418, performing artist talent quality and persona-related KPIs 420, social media user-related KPIs 422, and future commercial viability-related KPIs 424, as illustrated in FIG. 11.

The performing artist social presence related-KPIs 418 may indicate width and depth of social activities across various social media and multimedia platforms. For post-event KPIs, data may be filtered from performing artist web and social content database 206 with criterion. The criterion may be, for example, some specified event date that ranges from "Event−predefined months" to "Event+predefined years". Further, the performing artist talent quality and persona related KPIs 420 may indicate measure of degree of performing artist talent quality (for example, voice, song, or writing) based on social user opinions.

The detail description of each of the plurality of KPIs is illustrated in FIGS. 12A to 12C via exemplary table 1200. The table 1200 may include KPI category 1202 along with corresponding KPI name 1204 and corresponding KPI description 1206. The KPI category may include information related to calculated KPIs, for example, as shown in FIGS. 12A and 12C, the KPI category 1202 may include performing artist social presence related KPI 418, performing artist talent quality and persona-related KPIs 420, social media user-related KPIs 422, and future commercial viability-related KPIs 424, and the corresponding KPI name and KPI description for each of the KPI category 1202 is depicted in Table 1200.

Referring now to FIG. 13, an exemplary Table 1300 illustrating output data obtained from information exploration analysis, in accordance with an exemplary embodiment of the present disclosure. The Table 1300 may include a plurality of metrices related to performing artists of which KPIs is determined. In particular, the Table 1300 may include performing artist name 1304, their genre type 1302, and their relevant set of KPIs information.

The KPIs information may include, but are not limited to name of each of the KPIs determined i.e., performing artist social presence related-KPIs 418 along with their corresponding post-event post volume 1306 and multimedia diversity factor 1308 details, performing artist talent quality and persona-related KPIs 420 along with their corresponding persona-specific post volume 1310 and event participation count 1312 details, social media user-related KPIs 422 along with their corresponding social media user growth rate 1314 and total adversary volume 1316 details, and future commercial viability-related KPIs 424 along with their corresponding unique users willing to buy artist merchandise 1318 and unique users count willing to buy tickets 1320 details.

Referring back to FIG. 11, once the plurality of KPIs is determined via the information exploration module 212a, the contract-worthiness prediction model 212b development and validation may start with training data preparation 1102. The training data preparation 1102 may include tagging actual contract worthiness Indicator of a set of performing artists to output data of the information exploration module 2012a, at block 1104.

As illustrated in FIG. 14, analytical data for developing the contract worthiness prediction model 212b is depicted via an exemplary table 1400. The exemplary table 1400 may include the actual contract worthiness Indicator 1402 of a set of performing artist (for example, music artist) considering range of 0 to 1 i.e., Contract-worthy (1) and Not Contract-worthy (0)).

The actual contract worthiness indicator may be binary in nature i.e., actual contract worthiness indicator=1 which implies a performing artist is "Contract worthy", who has repeatedly signed contract (more than once) with single or multiple records companies. Further, the actual contract worthiness Indicator=0), implies a performing artist is "Not Contract worthy", who has never or only once signed contract with a records company.

Further, referring again to FIG. 11, the data may be split into training data and test data at block 1106. The training data may be used for training multiple ML models, at block 1108 to score contract-worthiness of various new music artists. Further, statistically significant and best ML model may be selected from the multiple ML models, at block 1110 and applied on test data, at block 1112. Further, the test data may be used for ML model validation and threshold value estimation for "Contract-worthy" and "Not Contract-worthy" categories, at step 1114. The output from a best ML model may be applied on the test data for contract worthiness score analysis, at step 1116. Furthermore, a ranking may be done on each of the set of performing artists as per performing artist-level contract worthiness score under individual music genres (in case when performing artist is a music artist), at block 1118. For example, a music artist with highest contract worthiness score implies a particular performing artist is most likely to be popular music star and may significantly contribute towards record company revenue.

Referring now to FIG. 15A, an exemplary table 1500A illustrating contract worthiness scores assigned to a set of performing artists, in accordance with an exemplary embodiment of the present disclosure. The Table 1500A may include genre 1502 of performing artists, performing artist name 1504, corresponding actual contract worthiness indicator 1506, and corresponding contract worthiness score 1508 for each of the performing artists. The actual contract worthiness indicator 1506 indicates which performing artist (for example, music artist) comes under "Contract-worthy" category and which performing artist comes under "Not Contract-worthy" category. The contract worthiness score 1508 is a continuous number which ranges between 0-1. The contract worthiness score 1508 for each of the performing artist is depicted in FIG. 15A.

Figure 15B:
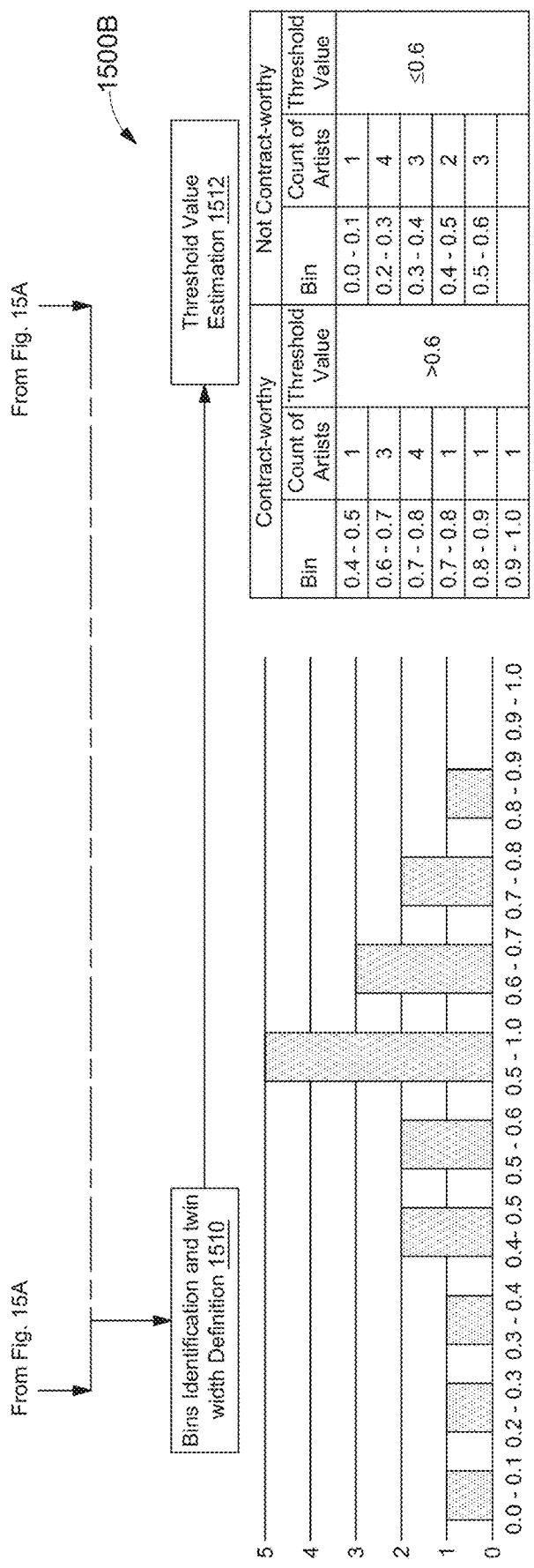
FIG. 15B illustrates a process flow for estimating worthiness score threshold, in accordance with an embodiment.

Referring now to FIG. 15B, illustrates a process flow for estimating worthiness score threshold, in accordance with an exemplary embodiment of the present disclosure. The estimation of worthiness score threshold (also referred as threshold value estimation 1512) may help in defining contract worthiness score bins for "Contract-worthy" and "Not Contract-worthy" categories.

For example, as illustrated in exemplary Table 1500B, score bin whose threshold value ranges from 0.61-1.0 implies that the performing artist is "Contract-worthy" for signing a contract and the score bin whose threshold value ranges from 0.00-0.60 implies that the performing artist is "Not Contract-worthy" for signing a contract. Prerequisite for threshold value estimation is bins identification and bin width definition. Therefore, for bins identification and bins width definition 1510, statistical techniques, such as histogram may be used to identify bins based on contract-worthiness score. These bins may be of equal width. Various open-source packages may be used to create histogram distribution of contract-worthiness score. Further, post bins identification techniques, such as confusion matrix may be used for individual contract worthiness categories i.e., "Contract-worthy" & "Not Contract-worthy".

Referring now to FIG. 16, an exemplary table 1600 illustrating a set of performing artists with their corresponding contract worthiness score, in accordance with an exemplary embodiment of the present disclosure. The exemplary Table 1600 may include their genre type 1302 of each of the performing artist, performing artist name 1304, KPIs name along with a set of KPIs information. The KPIs information may include name of each of the KPIs determined i.e., performing artist social presence related-KPIs 418 along with their corresponding post-event post volume 1306 and multimedia diversity factor 1308 details, performing artist talent quality and persona-related KPIs 420 along with their corresponding persona-specific post volume 1310 and event participation count 1312 details, social media user-related KPIs 422 along with their corresponding social media user growth rate 1314 and total adversary volume 1316 details, and future commercial viability-related KPIs 424 along with their corresponding unique users willing to buy artist merchandise 1318 and unique users count willing to buy tickets 1320 details.

The Table 1600 may further include information related to contract worthiness score 1602 assigned to each of the set of performing artists and corresponding contract worthiness indicator 1604 that may indicate which performing artist from the set of performing artist is "Contract Worthy" and which performing artist from the set of performing artist is "Not Contract Worthy" based on the assigned contract worthiness score.

Referring now to FIGS. 17 to 19, visualization of performing artist details and a plurality of charts corresponding to set of performing artists is illustrated via a Graphical User Interface (GUI), in accordance with an exemplary embodiment of the present disclosure. Once the one or more of the set of performing artists is evaluated for their contract worthiness based on the contract worthiness score and a threshold contract worthiness score, the visualization of performing artist details and the plurality of charts corresponding to each of the one or more of the set of performing artists may be represented via the GUI. The performing artist details may include the contract worthiness score, the assigned rank, and a geographical location, and the plurality of charts is based on the plurality of KPIs, the plurality of social media metrics, the one or more user engagement behavior segments, and the plurality of categories.

Figure 17A:
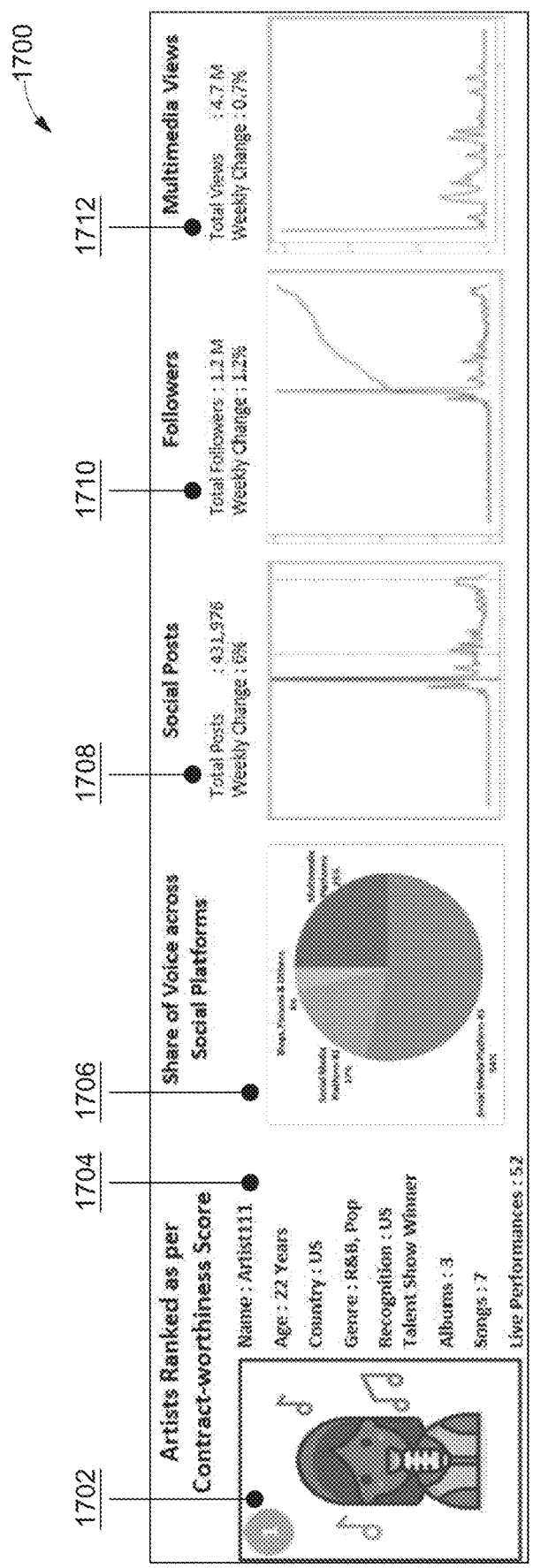
FIGS. 17A-17C illustrate exemplary Graphical User Interfaces (GUI) for visualizing performing artist details and a plurality of charts corresponding to set of performing artists, in accordance with an embodiment.
Figure 17B:
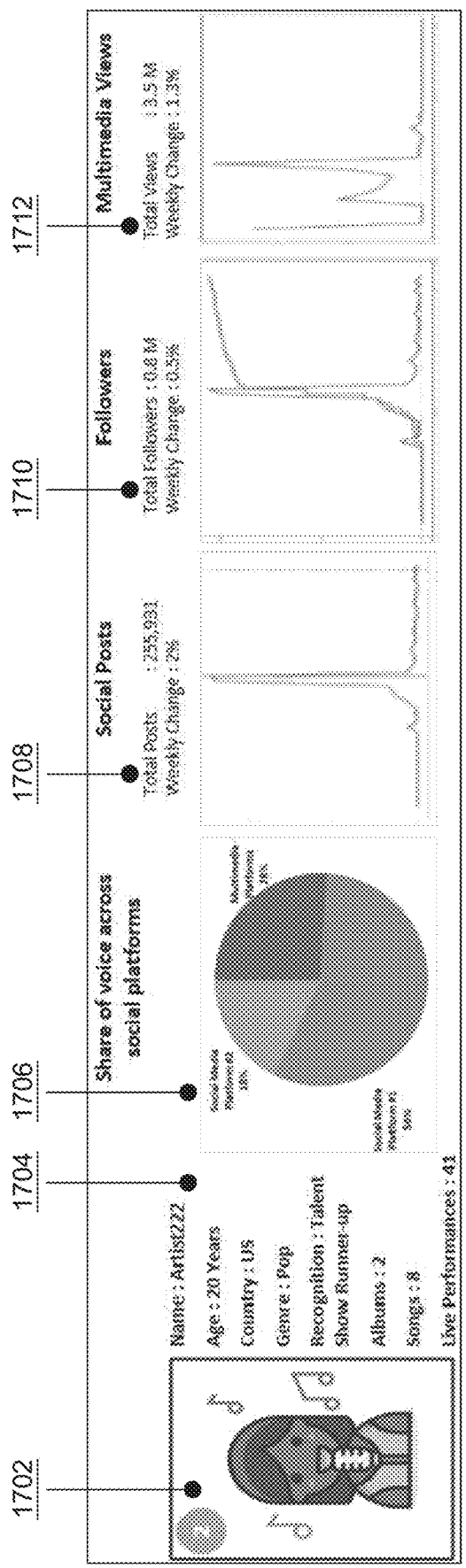
Figure 17C:
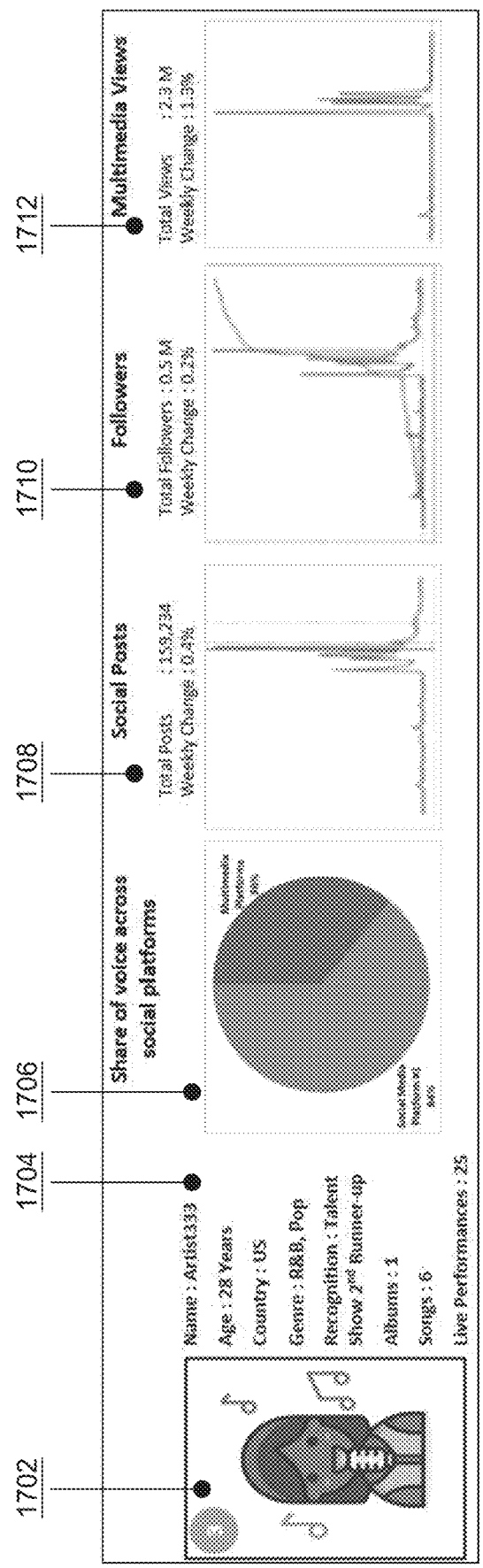
Figure 18A:
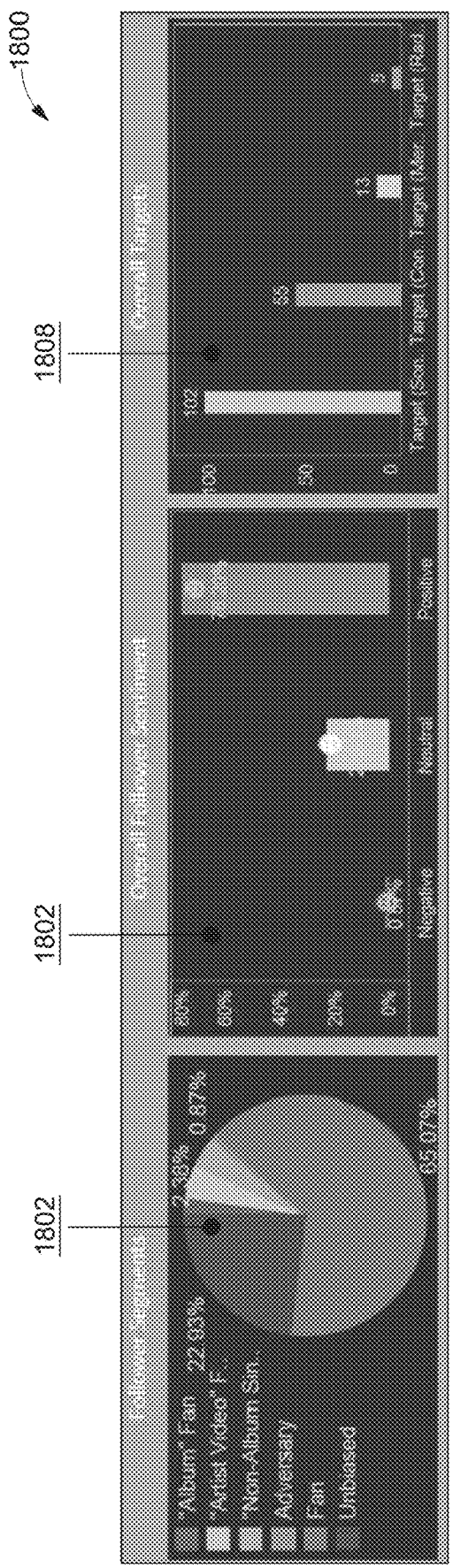
FIGS. 18A-18D illustrate exemplary GUIs for visualizing performing artist details and a plurality of charts corresponding to set of performing artists, in accordance with an embodiment.
Figure 18B:
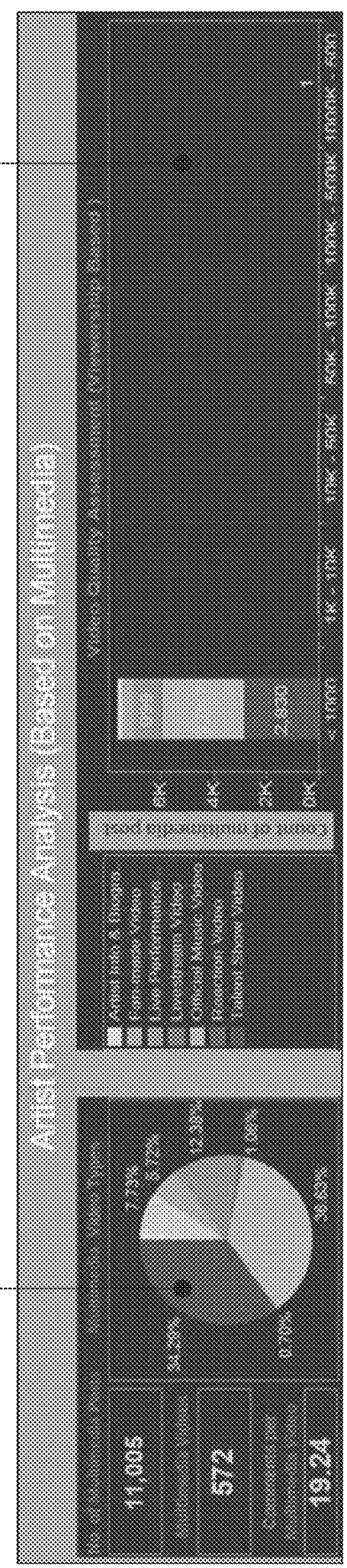
Figure 18C:
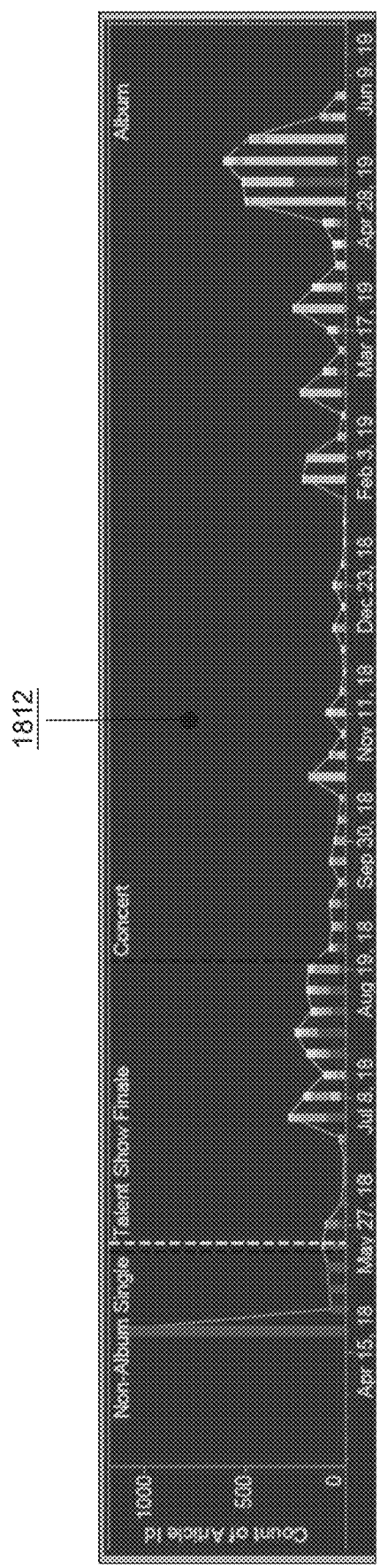
Figure 18D:
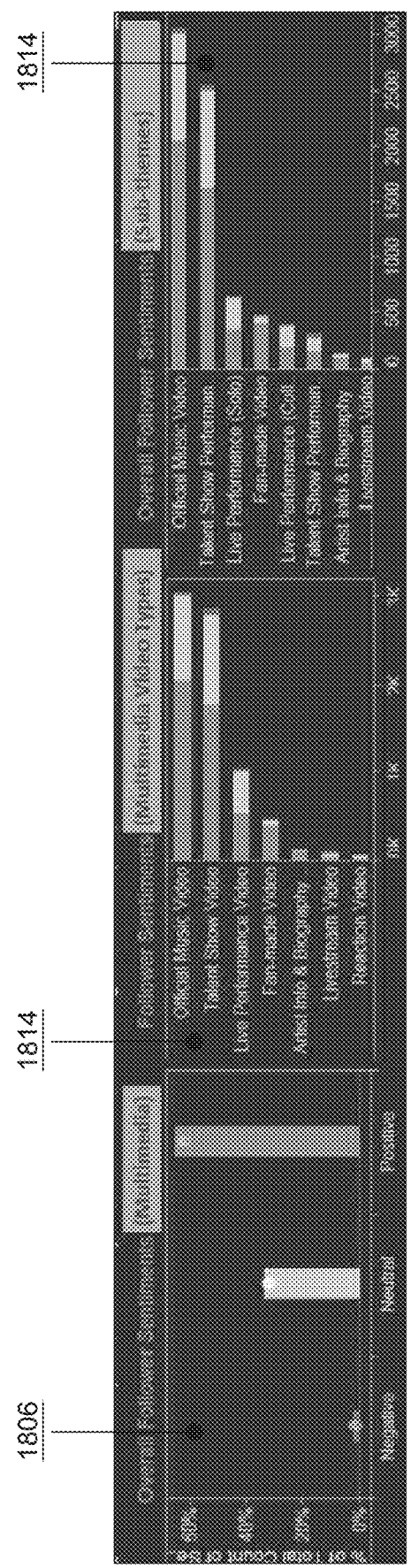
Figure 19A:
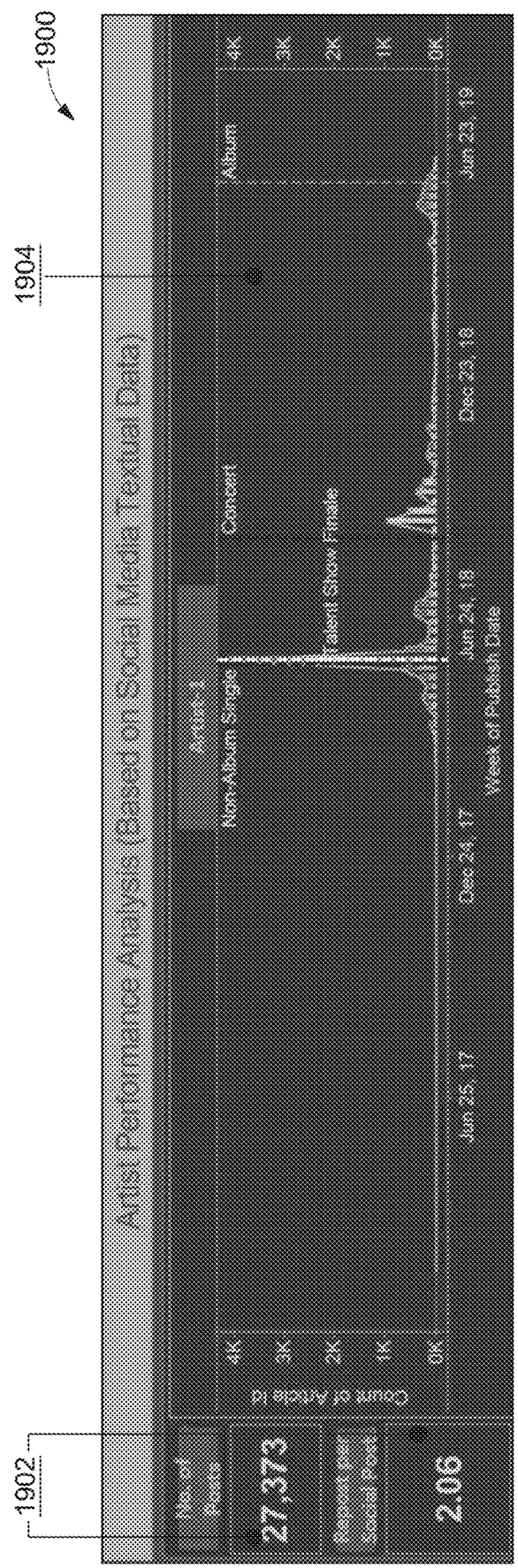
FIGS. 19A-19C illustrate exemplary GUIs for visualizing performing artist details and a plurality of charts corresponding to set of performing artists, in accordance with an embodiment.
Figure 19B:
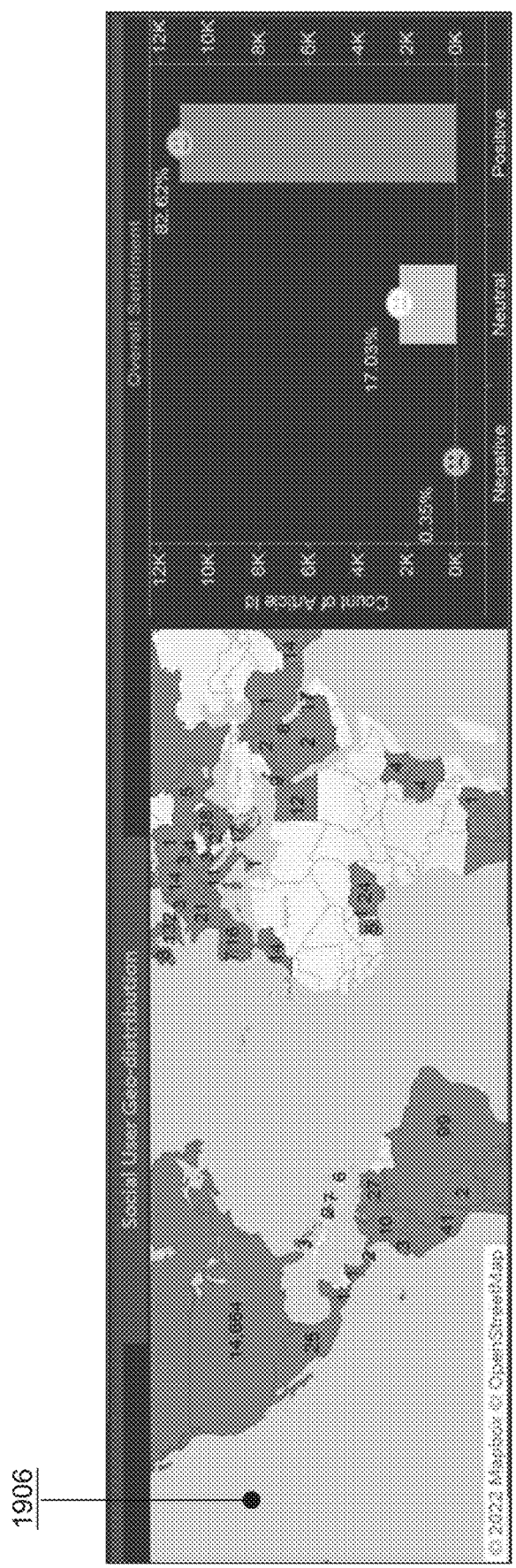
Figure 19C:
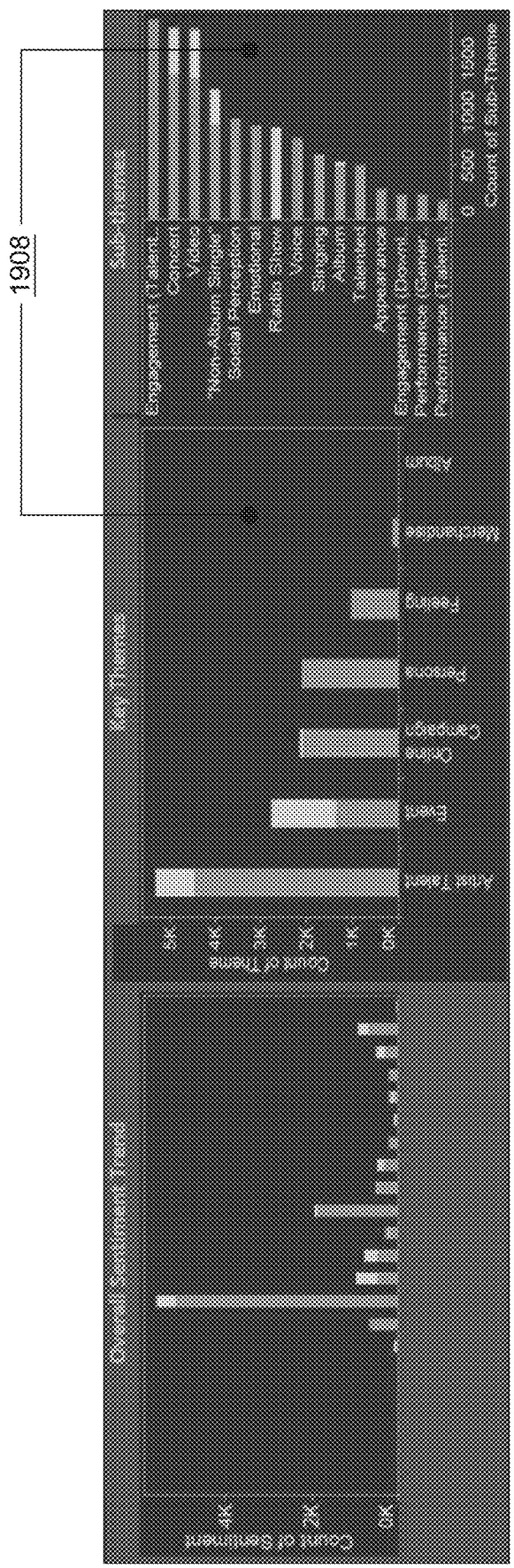

For example, visualization of overview of social media presence of music artist is illustrated in FIGS. 17A, 17B, and 17C, visualization of music artist performance analysis based on multimedia is illustrated in FIGS. 18A, 18B, 18C, and 18D and visualization of music artist performance analysis based on social media textual data is illustrated in FIGS. 19A, 19B, and 19C. These music artist social media performance and ranking related visualizations may be leveraged by key information consumers, such as, but not limited to, record label A&R teams, independent A&R experts who persistently follow social and web channels to analyze social posts and web information in order to identify potential music artists who are contract worthy. Also, the music artists may be potential consumers of above mentioned visualization as these are also keen to analyze social and web information to identify factors driving their popularity/user sentiments, compare themselves with other music artists, identify artist/s who are possible competition.

As illustrated in FIGS. 17A-17C, an exemplary GUI 1700 depicting the performing artist details i.e., ranking of each of the performing artists 1702 (based on contract worthiness), performing artists credential details 1704 (indicate count of albums, or singles). The exemplary GUI 1700 may further illustrate a plurality of social presence distribution charts 1706 (that may indicate diverse social presence, across multiple platforms, and compounds social post volume) and a plurality of trends i.e., social posts trend 1708, social followers trend 1710 (indicates large social follower base implies more opportunities to convert, and potential superstar has growing follower base) and multimedia content view trend 1712 (indicating view counts). The views may be significantly correlated with popularity and quality. In an embodiment, FIGS. 17A-C may represent components, which when combined, may form a single GUI. Alternately, the components may be rendered in a GUI in form of multiple pages or tabs. In some embodiments, the GUI 1700 may be customizable and each of the components of the GUI 1700 may be rearranged by a user.

As illustrated in FIG. 18A-18D, an exemplary GUI 1800 depicting a plurality of charts that indicate follower segment and overall sentiment 1802 (indicate followers that may be categorized based on their interest towards singles, albums, videos and in-general positive sentiment about artist), multimedia content-type distribution 1804, multimedia content follower sentiments 1806 (indicate overall follower sentiment over most popular video-sharing platform), target social media users 1808 (who are confirmed to spend towards music artist related songs/albums, concert/tours, merchandise, etc.), multimedia content quality 1810, multimedia content comments trend 1812, multimedia content sentiment driver analysis 1814. In an embodiment, FIGS. 18A-D may represent components, which when combined, may form a single GUI. Alternately, the components may be rendered in a GUI in form of multiple pages or tabs. In some embodiments, the GUI 1800 may be customizable and each of the components of the GUI 1800 may be rearranged by a user.

As illustrated in FIG. 19A-19C, an exemplary GUI 1900 depicting a plurality of graphs of social media posts volume and quality (1902 and 1904), and a graph of root cause analysis 1906. The social media post volume indicates level of interest around a performing artist and reposts per post indicates quality of posts. The social media posts volume and quality 1904 also indicate post themes (i.e., talent, persona, campaign, event related) driving growth/decline of post volume. The root cause analysis 1906 indicate sudden drop in social media posts that may be attributed to certain themes with negative sentiments. The GUI 1900 may further indicate social media follower geographical distribution 1908. The performing artists may plan tour/concerts based on follower density. In an embodiment, FIGS. 19A-C may represent components, which when combined, may form a single GUI. Alternately, the components may be rendered in a GUI in form of multiple pages or tabs. In some embodiments, the GUI 1900 may be customizable and each of the components of the GUI 1900 may be rearranged by a user.

As will be appreciated by one skilled in the art, a variety of processes may be employed for evaluating contract worthiness of performing artists. For example, the system 100 and the associated evaluation device 102 may evaluate contract worthiness of performing artists by the processes discussed herein. In particular, as will be appreciated by those of ordinary skill in the art, control logic and/or automated routines for performing the techniques and steps described herein may be implemented by the system 100 and the associated evaluation device 102 either by hardware, software, or combinations of hardware and software. For example, suitable code may be accessed and executed by the one or more processors on the system 100 to perform some or all of the techniques described herein. Similarly, application specific integrated circuits (ASICs) configured to perform some, or all of the processes described herein may be included in the one or more processors on the system 100.

Figure 20:
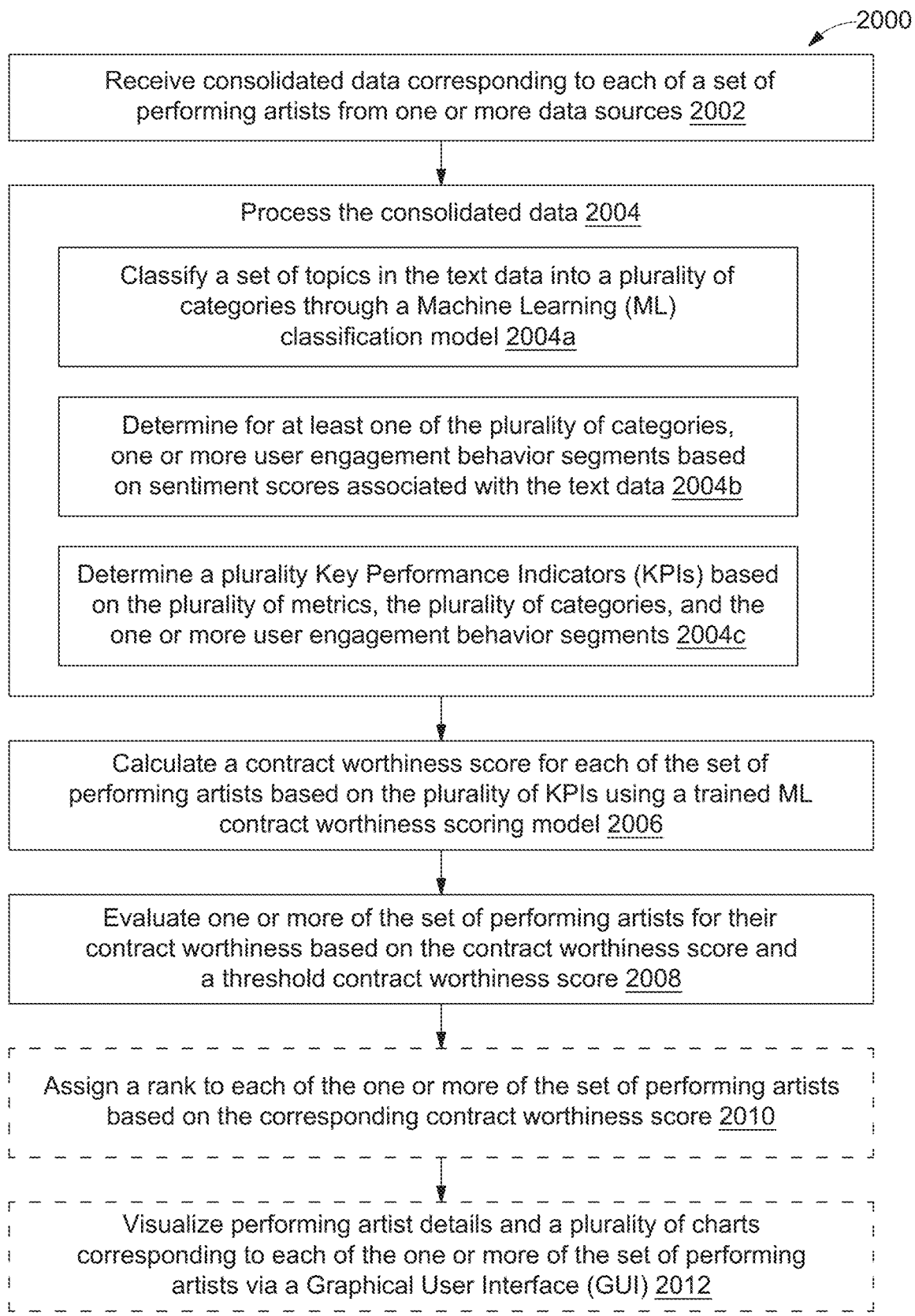
FIG. 20 is a flow diagram of a method for evaluating contract worthiness of performing artists is illustrated, in accordance with an embodiment.

Referring now to FIG. 20, a flow diagram of a method 2000 for evaluating contract worthiness of performing artists is illustrated, in accordance with an embodiment of the present disclosure. All the steps 2002-2012 may be performed by the modules 202-214 of the evaluation device 102. At step 2002, consolidated data corresponding to each of a set of performing artists may be received from one or more data sources. The consolidated data may include text data and a plurality of metrics from a plurality of digital platforms. The plurality of digital platforms may include a plurality of websites and a plurality of social media platforms.

In some embodiments, the consolidate data may be received by extracting web text data corresponding to a plurality of performing artists, in a user-defined art domain, from at least one of the plurality of websites, and applying a predefined filtering criteria on the web text data to identify the set of performing artists from the plurality of performing artists.

In some embodiments, the consolidate data may further be received by extracting the web text data and a plurality of web metrics corresponding to each of the set of performing artists from the plurality of websites, extracting social media text data and a plurality of social media metrics corresponding to each of the set of performing artists from the plurality of social media platforms, extracting social media text data and a plurality of social media metrics corresponding to each of the set of performing artists from the plurality of social media platforms, and for each of the set of performing artists, consolidating the web text data, the social media text data, the plurality of web metrics, and the plurality of social media metrics to obtain the consolidated data.

At step 2004, the consolidated data may be processed. In some embodiments, the processing the consolidated data may include identifying a plurality of keywords in the consolidated data using one or more natural language processing models, classifying each of the plurality of keywords into one or more set of keywords, and training a Machine Learning (ML) classification model. The trained ML classification model may further classify each of the set of keywords into relevant set of topics. For the processing of consolidated data, the step 2004 further includes a step 2004a and a step 2004b and a step 2004c. At step 2004a, the set of topics in the text data may be classified into a plurality of categories through the ML classification model. It may be noted that the text data may include user comment and multimedia content description, and the plurality of categories may include a plurality of user comment categorization and a plurality of multimedia content description categorization. The process of categorization is already explained in greater detail in conjunction with FIGS. 8A and 8B.

In some embodiments, the plurality of keywords may be classified into the plurality of categories by segregating the text data using a plurality of rules. At least one of the plurality of rules is based on a social media account ownership. The account ownership may correspond to one of a performing artist owned social media account, an associate partner owned social media account, and a celebrity and/or peer owned social media account.

At step 2004b, for at least one of the plurality of categories, one or more user engagement behavior segments may be determined based on sentiment scores associated with the text data. The sentiment scores may be determined using a ML sentiment analysis model. At step 2004c, a plurality KPIs may be determined based on the plurality of metrics, the plurality of categories, and the one or more user engagement behavior segments. The plurality of KPIs may include at least one of performing artist social presence related-KPIs, performing artist talent quality and persona-related KPIs, social media user-related KPIs, and future commercial viability-related KPIs.

At step 2006, a contract worthiness score for each of the set of performing artists may be calculated based on the plurality of KPIs using a trained ML contract worthiness scoring model. In some embodiments, the trained ML contract worthiness scoring model may be generated by creating a training dataset and a test dataset from historical data including the consolidated data for a plurality of artists in a pre-defined art domain with their known contract worthiness, training each of a set of ML contract worthiness scoring models using the training dataset, and selecting the trained ML contract worthiness scoring model based on a performance score of each of the set of ML contract worthiness scoring models with respect to the test dataset.

At step 2108, one or more of the set of performing artists may be evaluated for their contract worthiness based on the contract worthiness score and a threshold contract worthiness score. The threshold contract worthiness score may be determined based on a historical distribution of contract worthiness scores for the trained ML contract worthiness scoring model.

Once the one or more of the set of performing artists is evaluated for their contract worthiness, a rank may be assigned to each of the one or more of the set of performing artists based on the corresponding contract worthiness score, at step 2010. Further, at step 2012, a visualization of performing artist details and a plurality of charts corresponding to each of the one or more of the set of performing artists may done via a GUI. The performing artist details may include the contract worthiness score, the assigned rank, and a geographical location, and the plurality of charts may be based on the plurality of KPIs, the plurality of social media metrics, the one or more user engagement behavior segments, and the plurality of categories.

In some embodiments, a label may be assigned to each of the set of performing artists based on the corresponding contract worthiness score and the threshold contract worthiness score. The label may correspond to one of relevant or non-relevant with respect to the contract offering. It should be noted that the complete process of evaluating contract worthiness of performing artists is already explained in detail in conjunction with FIG. 2 to FIG. 19.

As will be appreciated by those skilled in the art, the techniques described in the various embodiments discussed above are not routine, or conventional, or well understood in the art. The techniques discussed above provide for evaluating contract worthiness of performing artists. The techniques provide genre-specific AI/ML based methodology to analyze social media performance and predict contract worthiness of music artists, primarily factoring opinions of social media users related to, but not limited to, music artist's talent, persona, quality of releases, willingness to spend on future releases/events. The techniques leverage social media data towards defining predictive variables and training data based on mapping music artist journey and key milestones, analyzing social user sentiments, understanding user engagement behavior, artist talent quality & persona, and Future commercial viability. Moreover, the disclosed techniques may identify unique social user engagement behavior segments (for example, fans, adversaries, or unbiased users), a plurality KPIs, a contract worthiness score, a threshold contract worthiness score, and thereby evaluating contract worthiness of the music artists based on the identification.

As will be also appreciated, the above-described techniques may take the form of computer or controller implemented processes and apparatuses for practicing those processes. The disclosure can also be embodied in the form of computer program code containing instructions embodied in tangible media, such as floppy diskettes, solid state drives, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

Figure 21:
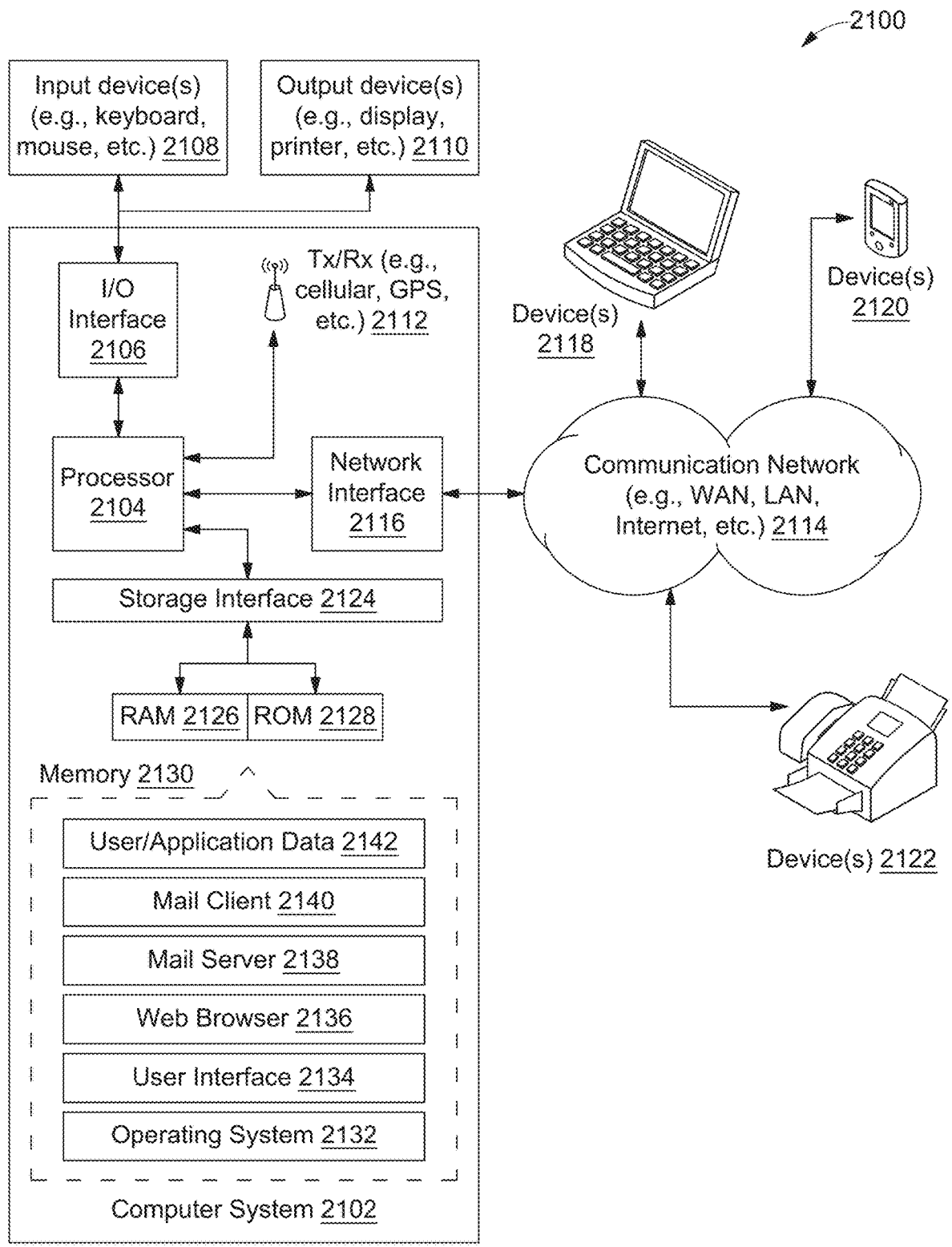
FIG. 21 is a block diagram of an exemplary computer system for implementing embodiments consistent with the present disclosure.

The disclosed methods and systems may be implemented on a conventional or a general-purpose computer system, such as a personal computer (PC) or server computer. Referring now to FIG. 21, a block diagram of an exemplary computer system 2102 for implementing embodiments consistent with the present disclosure is illustrated. Variations of computer system 2102 may be used for implementing the system 100 for evaluating contract-worthiness of performing artists. Computer system 2102 may include a central processing unit ("CPU" or "processor") 2104. Processor 2104 may include at least one data processor for executing program components for executing user-generated or system-generated requests. A user may include a person, a person using a device such as such as those included in this disclosure, or such a device itself. The processor may include specialized processing units such as integrated system (bus) controllers, memory management control units, floating point units, graphics processing units, digital signal processing units, etc. The processor may include a microprocessor, such as AMD® ATHLON®, DURON® OR OPTERON®, ARM's application, embedded or secure processors, IBM® POWERPC®, INTEL® CORE® processor, ITANIUM® processor, XEON® processor, CELERON® processor or other line of processors, etc. The processor 2104 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 2104 may be disposed in communication with one or more input/output (I/O) devices via I/O interface 2106. The I/O interface 2106 may employ communication protocols/methods such as, without limitation, audio, analog, digital, monoaural, RCA, stereo, IEEE-1394, near field communication (NFC), FireWire, Camera Link®, GigE, serial bus, universal serial bus (USB), infrared, PS/2, BNC, coaxial, component, composite, digital visual interface (DVI), high-definition multimedia interface (HDMI), radio frequency (RF) antennas, S-Video, video graphics array (VGA), IEEE 802.n/b/g/n/x, Bluetooth, cellular (e.g., code-division multiple access (CDMA), high-speed packet access (HSPA+), global system for mobile communications (GSM), long-term evolution (LTE), WiMAX, or the like), etc.

Using the I/O interface 2106, the computer system 2102 may communicate with one or more I/O devices. For example, the input device 2108 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, altimeter, gyroscope, proximity sensor, or the like), stylus, scanner, storage device, transceiver, video device/source, visors, etc. Output device 2110 may be a printer, fax machine, video display (e.g., cathode ray tube (CRT), liquid crystal display (LCD), light-emitting diode (LED), plasma, or the like), audio speaker, etc. In some embodiments, a transceiver 2112 may be disposed in connection with the processor 2104. The transceiver may facilitate various types of wireless transmission or reception. For example, the transceiver may include an antenna operatively connected to a transceiver chip (e.g., TEXAS INSTRUMENTS® WILINK WL1286®, BROADCOM® BCM4550IUB8 ®, INFINEON TECHNOLOGIES® X-GOLD 1436-PMB9800® transceiver, or the like), providing IEEE 802.11a/b/g/n, Bluetooth, FM, global positioning system (GPS), 2G/3G HSDPA/HSUPA communications, etc.

In some embodiments, the processor 2104 may be disposed in communication with a communication network 2116 via a network interface 2114. The network interface 2114 may communicate with the communication network 2116. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 2116 may include, without limitation, a direct interconnection, local area network (LAN), wide area network (WAN), wireless network (e.g., using Wireless Application Protocol), the Internet, etc. Using the network interface 2114 and the communication network 2116, the computer system 2102 may communicate with devices 2118, 2120, and 2122. These devices may include, without limitation, personal computer(s), server(s), fax machines, printers, scanners, various mobile devices such as cellular telephones, smartphones (e.g., APPLE® IPHONE®, BLACKBERRY® smartphone, ANDROID® based phones, etc.), tablet computers, eBook readers (AMAZON® KINDLE®, NOOK® etc.), laptop computers, notebooks, gaming consoles (MICROSOFT® XBOX®, NINTENDO® DS®, SONY® PLAYSTATION®, etc.), or the like. In some embodiments, the computer system 2102 may itself embody one or more of these devices.

In some embodiments, the processor 2104 may be disposed in communication with one or more memory devices 2130 (e.g., RAM 2126. ROM 2128, etc.) via a storage interface 2124. The storage interface may connect to memory devices 2130 including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI). STD Bus. RS-232, RS-422, RS-485, I2C, SPI, Microwire, 1-Wire, IEEE 1284, Intel® QuickPathInterconnect, InfiniBand, PCIe, etc. The memory drives may further include a drum, magnetic disc drive, magneto-optical drive, optical drive, redundant array of independent discs (RAID), solid-state memory devices, solid-state drives, etc.

The memory devices 2130 may store a collection of program or database components, including, without limitation, an operating system 2132, user interface application 2134, web browser 2136, mail server 2138, mail client 2140, user/application data 2142 (e.g., any data variables or data records discussed in this disclosure), etc. The operating system 2132 may facilitate resource management and operation of the computer system 2102. Examples of operating systems include, without limitation. APPLE® MACINTOSH® OS X. UNIX. Unix-like system distributions (e.g., Berkeley Software Distribution (BSD). FreeBSD. NetBSD. OpenBSD, etc.). Linux distributions (e.g, RED HAT®, UBUNTU®, KUBUNTU®, etc.). IBM® OS/2. MICROSOFT® WINDOWS® (XP®, Vista®/7/8, etc.). APPLE® IOS®, GOOGLE® ANDROID®, BLACKBERRY® OS, or the like. User interface 2134 may facilitate display, execution, interaction, manipulation, or operation of program components through textual or graphical facilities. For example, user interfaces may provide computer interaction interface elements on a display system operatively connected to the computer system 2102, such as cursors, icons, check boxes, menus, scrollers, windows, widgets, etc.

Graphical user interfaces (GUIs) may be employed, including, without limitation, APPLE® MACINTOSH® operating systems' AQUA® platform. IBM® OS/2 ®, MICROSOFT® WINDOWS® (e.g., AERO®, METRO®, etc.). UNIX X-WINDOWS, web interface libraries (e.g., ACTIVEX®, JAVA®, JAVASCRIPT®, AJAX®, HTML, ADOBE FLASH®, etc.), or the like.

In some embodiments, the computer system 2102 may implement a web browser 2136 stored program component. The web browser may be a hypertext viewing application, such as MICROSOFT® INTERNET EXPLORER®, GOOGLE® CHROME®, MOZILLA® FIREFOX®, APPLE® SAFARI®, etc. Secure web browsing may be provided using HTTPS (secure hypertext transport protocol), secure sockets layer (SSL). Transport Layer Security (TLS), etc. Web browsers may utilize facilities such as AJAX®, DHTML, ADOBE® FLASH®, JAVASCRIPT®, JAVA®, application programming interfaces (APIs), etc. In some embodiments, the computer system 2102 may implement a mail server 2138 stored program component. The mail server may be an Internet mail server such as MICROSOFT® EXCHANGE®, or the like. The mail server may utilize facilities such as ASP. ActiveX. ANSI C++/C #. MICROSOFT.NET® CGI scripts. JAVA®, JAVASCRIPT®, PERL®, PHP®, PYTHON®, WebObjects, etc. The mail server may utilize communication protocols such as internet message access protocol (IMAP), messaging application programming interface (MAPI). MICROSOFT® EXCHANGE®, post office protocol (POP), simple mail transfer protocol (SMTP), or the like. In some embodiments, the computer system 2102 may implement a mail client 2140 stored program component. The mail client may be a mail viewing application, such as APPLE MAIL®, MICROSOFT ENTOURAGE®, MICROSOFT OUTLOOK®, MOZILLA THUNDERBIRD®, etc.

In some embodiments, computer system 2102 may store user/application data 2142, such as the data, variables, records, etc. (e.g., the set of predictive models, the plurality of clusters, set of parameters (batch size, number of epochs, learning rate, momentum, etc.), accuracy scores, competitiveness scores, ranks, associated categories, rewards, threshold scores, threshold time, and so forth) as described in this disclosure. Such databases may be implemented as fault-tolerant, relational, scalable, secure databases such as ORACLE® OR SYBASE®. Alternatively, such databases may be implemented using standardized data structures, such as an array, hash, linked list, struct, structured text file (e.g., XML), table, or as object-oriented databases (e.g., using OBJECTSTORE®, POET®, ZOPE®, etc.). Such databases may be consolidated or distributed, sometimes among the various computer systems discussed above in this disclosure. It is to be understood that the structure and operation of the any computer or database component may be combined, consolidated, or distributed in any working combination.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Although the present invention has been described in connection with some embodiments, it is not intended to be limited to the specific form set forth herein. Rather, the scope of the present invention is limited only by the claims. Additionally, although a feature may appear to be described in connection with particular embodiments, one skilled in the art would recognize that various features of the described embodiments may be combined in accordance with the invention.

Furthermore, although individually listed, a plurality of means, elements or process steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather the feature may be equally applicable to other claim categories, as appropriate.

What is claimed is:

1. A method for evaluating contract worthiness of performing artists, comprising:
   extracting, by an evaluation device, web text data corresponding to a plurality of performing artists from a plurality of websites;
   applying, by the evaluation device, a predefined filtering criteria on the web text data to identify a set of performing artists from the plurality of performing artists;
   extracting, by the evaluation device, the web text data and a plurality of web metrics corresponding to each of the set of performing artists from the plurality of websites;
   extracting, by the evaluation device, social media text data and a plurality of social media metrics corresponding to each of the set of performing artists from a plurality of social media platforms;
   consolidating, by the evaluation device, for each of the set of performing artists, the web text data, the social media text data, the plurality of web metrics, and the plurality of social media metrics to obtain consolidated data;
   training, by the evaluation device, a machine learning (ML) classification model to classify keywords into relevant topics, based on a training dataset that comprises a plurality of keyword sets, wherein each of the plurality of keyword sets comprises a keyword description and associated relevant keywords;
   processing, by the evaluation device, the consolidated data by:
      providing, by the evaluation device, a set of topics in the web text data and the social media text data as input to the trained ML classification model;
      classifying, by the evaluation device, the set of topics into a plurality of categories based on an output of the trained ML classification model to the provided input;
      determining, by the evaluation device, for at least one of the plurality of categories, one or more user engagement behavior segments based on sentiment scores associated with the text data, wherein the sentiment scores are determined using an ML sentiment analysis model; and determining, by the evaluation device, a plurality of Key Performance Indicators (KPIs) based on the plurality of web metrics, the plurality of social media metrics, the plurality of categories, and the one or more user engagement behavior segments;

calculating, by the evaluation device, a contract worthiness score for each of the set of performing artists based on the plurality of KPIs using a trained ML contract worthiness scoring model; and evaluating, by the evaluation device, each of the set of performing artists for contract worthiness based on a corresponding contract worthiness score and a threshold contract worthiness score, wherein the threshold contract worthiness score is determined based on a historical distribution of contract worthiness scores for the trained ML contract worthiness scoring model.

2. The method of claim 1, further comprising assigning a rank to each of the set of performing artists based on the corresponding contract worthiness score.

3. The method of claim 2, further comprising visualizing performing artist details and a plurality of charts corresponding to each of the set of performing artists via a Graphical User Interface (GUI), wherein the performing artist details comprise the contract worthiness score, the assigned rank, and a geographical location, and wherein the plurality of charts is based on the plurality of KPIs, the plurality of social media metrics, the plurality of web metrics the one or more user engagement behavior segments, and the plurality of categories.

4. The method of claim 1, further comprising assigning a label to each of the set of performing artists based on the corresponding contract worthiness score and the threshold contract worthiness score, wherein the label corresponds to one of relevant or non-relevant with respect to a contract offering.

5. The method of claim 1, wherein the web text data and the social media text data comprise user comment and multimedia content description, and wherein the plurality of categories comprises a plurality of user comment categorization and a plurality of multimedia content description categorization.

6. The method of claim 1, wherein the classification of the set of topics into the plurality of categories comprises segregating the web text data and the social media text data using a plurality of rules, and wherein at least one of the plurality of rules is based on a social media account ownership.

7. The method of claim 1, further comprising generating the trained ML contract worthiness scoring model by:
creating a training dataset and a test dataset from historical data comprising the consolidated data for a plurality of artists in a pre-defined art domain with their known contract worthiness;
training each of a set of ML contract worthiness scoring models using the training dataset; and
selecting the trained ML contract worthiness scoring model based on a performance score of each of the set of ML contract worthiness scoring models with respect to the test dataset.

8. The method of claim 1, wherein the plurality of KPIs comprises at least one of performing artist social presence related-KPIs, performing artist talent quality and persona-related KPIs, social media user-related KPIs, and future commercial viability-related KPIs.

9. A system for evaluating contract worthiness of performing artists, the system comprising:
a processor; and
a memory communicatively coupled to the processor, wherein the memory stores instructions, and wherein the processor, based on execution of the instructions, is configured to:
extract web text data corresponding to a plurality of performing artists from at least one of a plurality of websites;
apply a predefined filtering criteria on the web text data to identify a set of performing artists from the plurality of performing artists;
extract the web text data and a plurality of web metrics corresponding to each of the set of performing artists from the plurality of websites;
extract social media text data and a plurality of social media metrics corresponding to each of the set of performing artists from a plurality of social media platforms;
consolidate, for each of the set of performing artists, the social media text data, the plurality of web metrics, and the plurality of social media metrics to obtain consolidated data;
train a machine learning (ML) classification model to classify keywords into relevant topics, based on a training dataset that comprises a plurality of keyword sets,
wherein each of the plurality of keyword sets comprises a keyword description and associated relevant keywords;
process the consolidated data, wherein to process the consolidated data, the processor is configured to:
provide a set of topics in the web text data and the social media text data as input to the trained ML classification model;
classify the set of topics into a plurality of categories, based on an output of the trained ML classification model to the provided input;
determine, for at least one of the plurality of categories, one or more user engagement behavior segments based on sentiment scores associated with the text data, wherein the sentiment scores are determined using an ML sentiment analysis model; and
determine a plurality of Key Performance Indicators (KPIs) based on the plurality of social media metrics, the plurality of web metrics, the plurality of categories, and the one or more user engagement behavior segments;
calculate a contract worthiness score for each of the set of performing artists based on the plurality of KPIs using a trained ML contract worthiness scoring model; and
evaluate each of the set of performing artists for contract worthiness based on a corresponding contract worthiness score and a threshold contract worthiness score, wherein the threshold contract worthiness score is determined based on a historical distribution of contract worthiness scores for the trained ML contract worthiness scoring model.

10. The system of claim 9, wherein the processor is further configured to assign a rank to each of the set of performing artists based on the corresponding contract worthiness score.

11. The system of claim 10, wherein the processor is further configured to visualize performing artist details and a plurality of charts corresponding to each of the set of performing artists via a Graphical User Interface (GUI), wherein the performing artist details comprise the contract worthiness score, the assigned rank, and a geographical location, and wherein the plurality of charts is based on the plurality of KPIs, the plurality of social media metrics, the one or more user engagement behavior segments, and the plurality of categories.

12. The system of claim 9, wherein the processor is further configured to assign a label to each of the set of performing artists based on the corresponding contract worthiness score and the threshold contract worthiness score, and wherein the label corresponds to one of relevant or non-relevant with respect to a contract offering.

13. The system of claim 9, wherein to classify the set of topics into the plurality of categories, the processor is further configured segregate the web text data and the social media text data using a plurality of rules, and wherein at least one of the plurality of rules is based on a social media account ownership.

14. The system of claim 9, wherein the processor is further configured to generate the trained ML contract worthiness scoring model, and wherein to generate the trained ML contract worthiness scoring model, the processor is further configured to:
  create a training dataset and a test dataset from historical data comprising the consolidated data for a plurality of artists in a pre-defined art domain with their known contract worthiness;
  train each of a set of ML contract worthiness scoring models using the training dataset; and
  select the trained ML contract worthiness scoring model based on a performance score of each of the set of ML contract worthiness scoring models with respect to the test dataset.

15. The system of claim 9, wherein the plurality of KPIs comprises at least one of performing artist social presence related-KPIs, performing artist talent quality and persona-related KPIs, social media user-related KPIs, and future commercial viability-related KPIs.

16. A non-transitory computer-readable medium storing computer-executable instructions for evaluating contract worthiness of performing artists, the computer-executable instructions configured for:
  extracting web text data corresponding to a plurality of performing artists from a plurality of websites;
  applying a predefined filtering criteria on the web text data to identify a set of performing artists from the plurality of performing artists;
  extracting the web text data and a plurality of web metrics corresponding to each of the set of performing artists from the plurality of websites;
  extracting social media text data and a plurality of social media metrics corresponding to each of the set of performing artists from a plurality of social media platforms;
  consolidating for each of the set of performing artists, the web text data, the social media text data, the plurality of web metrics, and the plurality of social media metrics to obtain consolidated data;
  training a machine learning (ML) classification model to classify keywords into relevant topics, based on a training dataset that comprises a plurality of keyword sets, wherein each of the plurality of keyword sets comprises a keyword description and associated relevant keywords;
  processing the consolidated data by:
    providing a set of topics in the web text data and the social media text data as input to the trained ML classification model;
    classifying the set of topics into a plurality of categories based on an output of the trained ML classification model to the provided input;
    determining, for at least one of the plurality of categories, one or more user engagement behavior segments based on sentiment scores associated with the text data, wherein the sentiment scores are determined using an ML sentiment analysis model; and
    determining a plurality of Key Performance Indicators (KPIs) based on the plurality of social media metrics, the plurality of web metrics, the plurality of categories, and the one or more user engagement behavior segments;
  calculating a contract worthiness score for each of the set of performing artists based on the plurality of KPIs using a trained ML contract worthiness scoring model; and
  evaluating each of the set of performing artists for their contract worthiness based on a corresponding contract worthiness score and a threshold contract worthiness score, wherein the threshold contract worthiness score is determined based on a historical distribution of contract worthiness scores for the trained ML contract worthiness scoring model.

\* \* \* \* \*